(12) United States Patent
Weinhardt et al.

(10) Patent No.: US 9,707,701 B2
(45) Date of Patent: *Jul. 18, 2017

(54) METHOD AND SYSTEM FOR MORTAR REMOVAL

(71) Applicant: Sky Climber Field Services, LLC, Delaware, OH (US)

(72) Inventors: Ed Weinhardt, St. Louis, MO (US); George Anasis, New Albany, OH (US); Spencer Tannenbaum, Delaware, OH (US)

(73) Assignee: SKY CLIMBER FIELD SERVICES, LLC, Delaware, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 15/408,801

(22) Filed: Jan. 18, 2017

(65) Prior Publication Data

US 2017/0129137 A1 May 11, 2017

Related U.S. Application Data

(63) Continuation of application No. 14/834,416, filed on Aug. 24, 2015, now Pat. No. 9,579,824, which is a continuation-in-part of application No. 13/955,074, filed on Jul. 31, 2013, now Pat. No. 9,114,533, which is a continuation of application No. 12/961,942, filed on Dec. 7, 2010, now Pat. No. 8,527,103.

(51) Int. Cl.
| | |
|---|---|
| *B28D 1/00* | (2006.01) |
| *B28D 1/04* | (2006.01) |
| *B28D 1/18* | (2006.01) |
| *B25J 9/16* | (2006.01) |
| *B28D 7/02* | (2006.01) |
| *G05B 19/19* | (2006.01) |

(52) U.S. Cl.
CPC ............ *B28D 1/185* (2013.01); *B25J 9/1679* (2013.01); *B28D 1/00* (2013.01); *B28D 1/04* (2013.01); *B28D 1/18* (2013.01); *B28D 7/02* (2013.01); *G05B 19/19* (2013.01); *G05B 2219/45086* (2013.01)

(58) Field of Classification Search
CPC . B28D 1/00; B28D 1/001; B28D 1/04; B28D 1/045; B28D 1/18185; B25J 9/1679; G05B 2219/45086
USPC ........ 451/28, 54, 57, 65, 67, 456; 125/13.01
See application file for complete search history.

(56) References Cited

U.S. PATENT DOCUMENTS

| | | | |
|---|---|---|---|
| 3,585,980 A * | 6/1971 | Mellor | ................. B24B 55/102 125/13.01 |
| 4,000,954 A | 1/1977 | Patel | |
| 4,497,114 A | 2/1985 | Belcher | |

(Continued)

FOREIGN PATENT DOCUMENTS

| | | |
|---|---|---|
| AU | 1936000542 | 2/1937 |
| AU | 1961000403 | 1/1963 |

(Continued)

*Primary Examiner* — Eileen Morgan
(74) *Attorney, Agent, or Firm* — Gallagher & Dawsey Co., LPA; David J. Dawsey; Michael J. Gallagher

(57) ABSTRACT

A method and system for removing mortar from a plurality of joints between a plurality of masonry units in a masonry structure, incorporating a suspension work platform, a work tool, and an articulating arm system (500).

20 Claims, 17 Drawing Sheets

(56) References Cited

U.S. PATENT DOCUMENTS

| | | | |
|---|---|---|---|
| 4,557,246 A * | 12/1985 | Seeley | B28D 1/001 125/26 |
| 4,879,780 A | 11/1989 | Prebeck | |
| 4,937,027 A | 6/1990 | Oshio et al. | |
| 5,191,718 A | 3/1993 | Fox | |
| 5,275,327 A | 1/1994 | Watkins et al. | |
| 5,291,718 A | 3/1994 | Moran | |
| 5,651,727 A * | 7/1997 | Weinstein | B24B 57/02 451/344 |
| 5,671,725 A | 9/1997 | Dishaw | |
| 5,956,253 A | 9/1999 | Gottschalk | |
| 5,992,404 A * | 11/1999 | Bleyer | B24C 3/02 125/26 |
| 6,153,848 A | 11/2000 | Nagae et al. | |
| 6,231,280 B1 | 5/2001 | Bullen | |
| 6,298,279 B1 | 10/2001 | Shimada et al. | |
| 6,318,352 B1 * | 11/2001 | Gnazzo | B23D 59/006 125/12 |
| 6,425,952 B1 | 7/2002 | Krapivner | |
| 6,595,196 B2 * | 7/2003 | Bath | B24B 55/052 125/13.01 |
| 6,719,504 B2 * | 4/2004 | Downey | B28D 1/00 144/136.95 |
| 6,769,423 B1 * | 8/2004 | Zhang | B28D 1/048 125/13.01 |
| 6,783,563 B1 | 8/2004 | Eckhoff et al. | |
| 6,859,680 B2 | 2/2005 | Fujita et al. | |
| 6,949,005 B1 | 9/2005 | Larsen et al. | |
| 7,047,588 B2 | 5/2006 | Bennett | |
| 7,094,128 B2 | 8/2006 | Vianello et al. | |
| 7,150,064 B2 | 12/2006 | Edwards | |
| 7,423,734 B1 | 9/2008 | Luik | |
| 8,228,647 B2 | 7/2012 | Lee | |
| 8,527,103 B2 | 9/2013 | Weinhardt et al. | |
| 2003/0079586 A1 * | 5/2003 | Zukley | B09B 5/00 83/13 |
| 2004/0068819 A1 | 4/2004 | Nistico | |
| 2007/0000724 A1 | 1/2007 | Anasis et al. | |
| 2010/0133247 A1 | 6/2010 | Mazumder et al. | |
| 2010/0236007 A1 | 9/2010 | Lawes | |
| 2011/0250825 A1 * | 10/2011 | Smith | B24B 27/08 451/259 |
| 2012/0143380 A1 | 6/2012 | Weinhardt et al. | |

FOREIGN PATENT DOCUMENTS

| | | |
|---|---|---|
| AU | 1968037545 | 11/1969 |
| WO | 8604948 A1 | 8/1986 |
| WO | 03000477 A2 | 1/2003 |
| WO | 2010043547 A1 | 4/2010 |
| WO | 2012051611 A1 | 4/2012 |

* cited by examiner

METHOD AND SYSTEM FOR MORTAR REMOVAL

CROSS-REFERENCE TO RELATED APPLICATIONS

This application is a continuation of the previously filed U.S. patent application Ser. No. 14/834,416 filed Aug. 24, 2015, which is a continuation-in-part of the previously filed U.S. patent application Ser. No. 13/955,074, filed Jul. 31, 2013, which is a continuation of the previously filed U.S. patent application Ser. No. 12/961,942, filed Dec. 7, 2010, now U.S. Pat. No. 8,527,103, and claims the benefit of the previously filed applications under 35 U.S.C. §120. Related application concerning suspension platform systems is U.S. Pat. No. 9,217,254, filed on Dec. 23, 2013, and is incorporated by reference herein in its entirety.

STATEMENT REGARDING FEDERALLY SPONSORED RESEARCH OR DEVELOPMENT

Not applicable.

TECHNICAL FIELD

The present disclosure relates to the field of masonry and masonry restoration, and more particularly, to a method and system for removing mortar from a plurality of joints between a plurality of masonry units in a masonry structure.

BACKGROUND OF THE INVENTION

Over time, every masonry structure will require the mortar between masonry joints to be removed and replaced with new mortar. The mortar between masonry joints is very important for a number of reasons. For example, the mortar provides the strength to hold the masonry units together; it serves as a type of cushion between masonry units; and it provides a water-resistant barrier to help prevent moisture and other contaminants from entering the structure. Thus, when the mortar begins to show signs of deterioration, it must be removed and replaced with new mortar to continue providing the above-enumerated benefits.

The process of removing the deteriorated mortar and replacing it with new mortar is referred to as repointing, which is sometimes called either pointing or tuckpointing. Prior art methods of mortar removal utilize manual hand tools and powered hand tools. Such methods are very labor intensive and time consuming, which makes the current repointing methods very expensive. In addition, the process of removing the deteriorated mortar from the masonry joints generates silica dust. Masonry workers who inhale silica dust run the risk of developing silicosis, a disabling and many times fatal disease that affects the lungs.

What is needed in the art is a device for removing deteriorated mortar from masonry joints that is less labor intensive and time consuming and that also reduces or eliminates the exposure of silica dust to the worker. The presently disclosed method and system for mortar removal addresses these needs, as well as others.

SUMMARY OF THE INVENTION

In its most general configuration, the method and system for mortar removal advances the state of the art with a variety of new capabilities and overcomes many of the shortcomings of prior devices in new and novel ways. The method and system for mortar removal overcomes the shortcomings and limitations of the prior art in any of a number of generally effective configurations. The method and system for mortar removal demonstrates such capabilities and overcomes many of the shortcomings of prior devices and methods in new and novel ways.

The present disclosure relates to a method and system for removing mortar from a plurality of joints between a plurality of masonry units in a masonry structure. The steps for accomplishing the method include sensing the location of at least one of the plurality of joints between the plurality of masonry units and transmitting joint location data to a computer control system. Next, the computer control system computes a work path based upon the joint location data. In a further step, the computer control system controls the position and operation of at least one work tool such that the at least one work tool moves along the work path to remove mortar from at least a portion of one of the plurality of joints along the work path. Finally, the dust and debris generated when the at least one work tool removes mortar from at least a portion of one of the plurality of joints along the work path is contained and removed.

The system for mortar removal generally includes a joint identification device, at least one work tool, a containment system, and a computer control system that is in electrical communication with the joint identification device and the at least one work tool. An access system may be provided to raise and lower the various components of the system for mortar removal along an exterior of the masonry structure.

The joint identification device is configured to sense the location of at least one of the plurality of joints between the plurality of masonry units and transmit joint location data to the computer control system. In a particular embodiment, the joint identification device comprises an optical shape recognition sensor to optically sense the location of at least one of the plurality of joints.

The at least one work tool is utilized to remove mortar from at least a portion of one of the plurality of joints between the plurality of masonry units. In one embodiment, a circular blade is used to remove mortar from the joints. In another embodiment, a square bit may be utilized to remove mortar from the joints. Still further, in another embodiment, a tool changing system having a tool magazine for holding a plurality of work tools may be utilized to change out the at least one work tool used to remove mortar from the joints.

During mortar removal, a containment system may be utilized to collect dust and debris generated during the mortar removal process. The containment system includes a suction hood for enclosing the at least one work tool and for forming a seal against the masonry structure. Secured to the suction hood is a vacuum system for removing dust and debris from the suction hood.

The general operation of the system for mortar removal is facilitated by the computer control system. As previously mentioned, the computer control system is in communication with the joint identification device and the at least one work tool. The computer control system is capable of sending and receiving electrical signals representative of commands and/or data to and from the joint identification device and the at least one work tool. For example, the computer control system receives the joint location data from the joint identification device and computes a work path based upon the joint location data. Further, the computer control system controls the position and operation of the at least one work tool such that the at least one work tool removes mortar from at least a portion of one of the plurality of joints along the work path.

In one embodiment, the method may further include the step of brushing at least a portion of one of the plurality of joints along the work path after mortar has been removed. This step helps to properly prepare the joints so that they may filled in with new mortar. In yet another embodiment, the method for mortar removal may include the step of blowing air into at least a portion of one of the plurality of joints along the work path after mortar has been removed. Preferably this step follows the step of brushing the plurality of joints. Blowing air into the joints further prepares the joints so that they may be filled in with new mortar.

The presently disclosed method and system for mortar removal provides an alternative to the prior art methods that are labor intensive and time consuming. The presently disclosed method and system for mortar removal also promotes worker safety by containing contaminants and eliminating the risk of a worker developing carpal tunnel syndrome caused by grinding the mortar by hand. Further, the method and system for mortar removal will reduce injuries caused by the prior art hand tools utilized to remove mortar from joints.

A work tool may be mounted on a tool support structure, which together with a suspended work platform, may in turn be mounted on at least one modular mast for elevated projects. The work tool may be suspended from an articulating arm system, and may be configured so that the work tool may be independently adjusted in pitch, roll, yaw, elevation and cutting depth. The tool support platform and suspended work platform may both be repositioned as needed so that a larger number of joints may be reached.

BRIEF DESCRIPTION OF THE DRAWINGS

Without limiting the scope of the method and system for mortar removal as claimed below and referring now to the drawings and figures:

Figure 1:
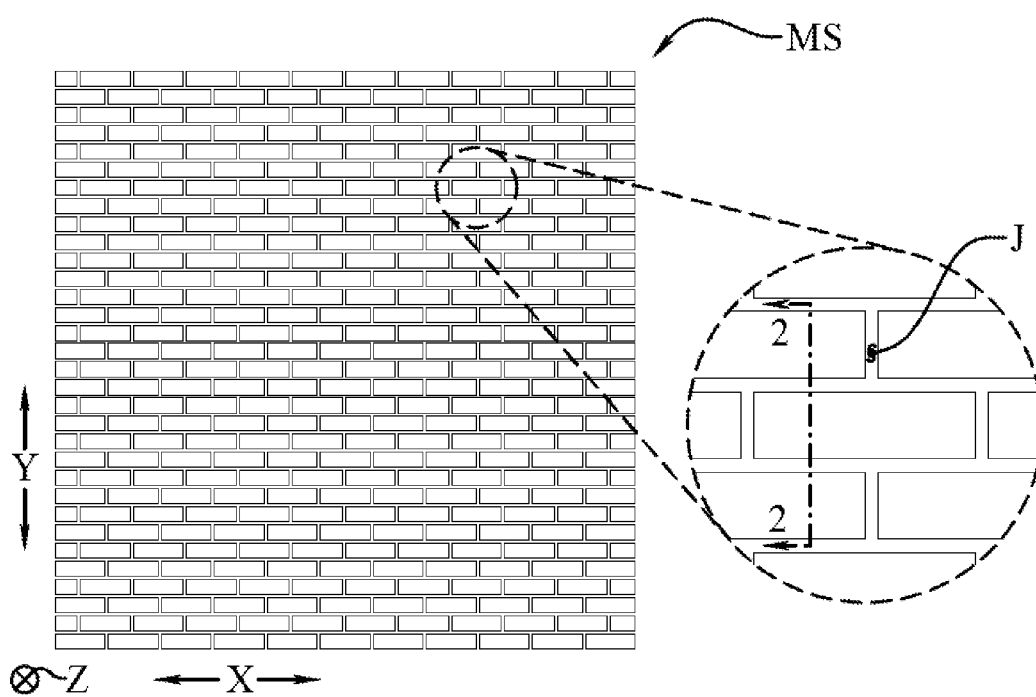
FIG. 1 is an elevation view of a portion of a masonry structure, not to scale.

These drawings are provided to assist in the understanding of the exemplary embodiments of the method and system for mortar removal as described in more detail below and should not be construed as unduly limiting the system. In particular, the relative spacing, positioning, sizing and dimensions of the various elements illustrated in the drawings are not drawn to scale and may have been exaggerated, reduced or otherwise modified for the purpose of improved clarity. Those of ordinary skill in the art will also appreciate that a range of alternative configurations have been omitted simply to improve the clarity and reduce the number of drawings.

DETAILED DESCRIPTION OF THE INVENTION

The presently disclosed method and system (10) for mortar removal enables a significant advance in the state of the art. The preferred embodiments of the method and system (10) accomplish this by new and novel arrangements of elements and methods that are configured in unique and novel ways and which demonstrate previously unavailable but preferred and desirable capabilities. The description set forth below in connection with the drawings is intended merely as a description of the embodiments of the claimed method and system (10), and is not intended to represent the only form in which the method and system (10) may be constructed or utilized. The description sets forth the designs, functions, means, and methods of to implementing the method and system (10) in connection with the illustrated embodiments. It is to be understood, however, that the same or equivalent functions and features may be accomplished by different embodiments that are also intended to be encompassed within the spirit and scope of the claimed method and system (10).

Figure 8:
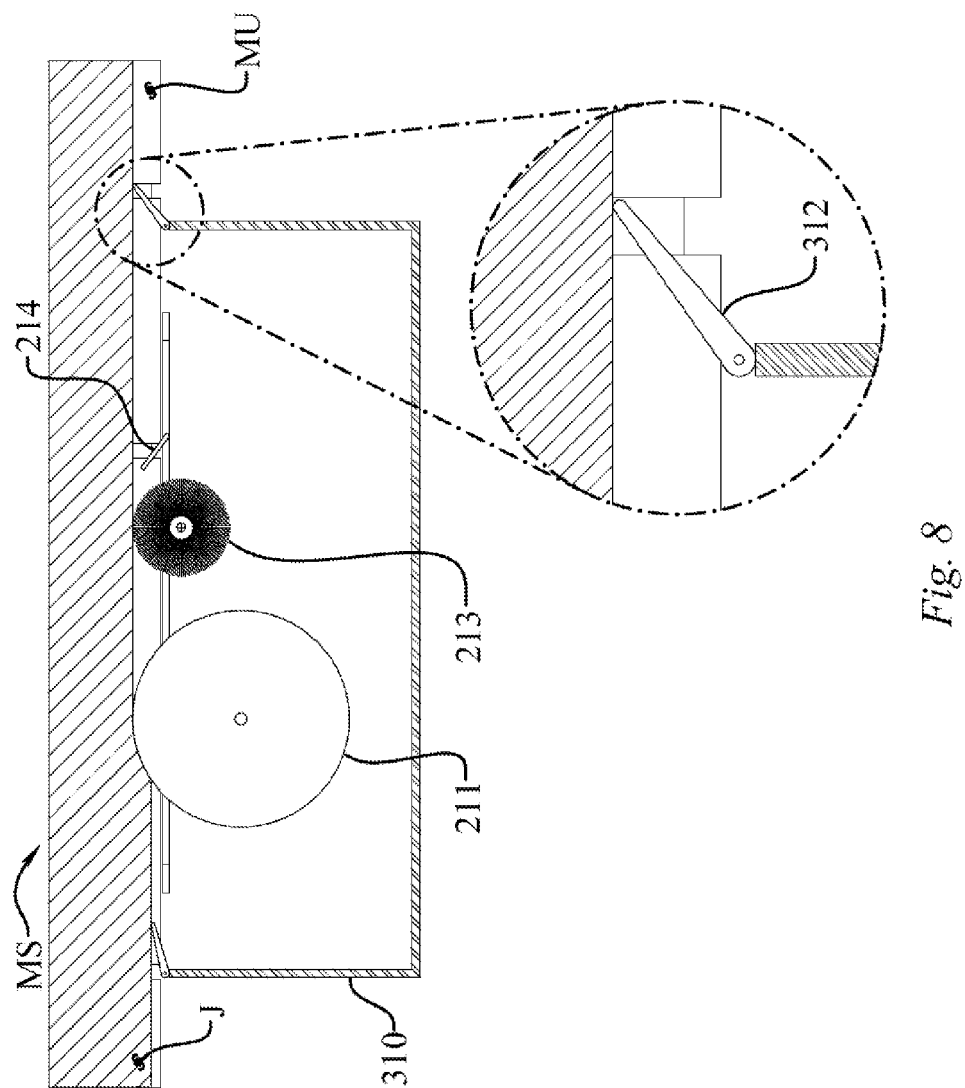
FIG. 8 is a cross sectional view of a portion of an embodiment of a system for mortar removal, not to scale.
Figure 9:
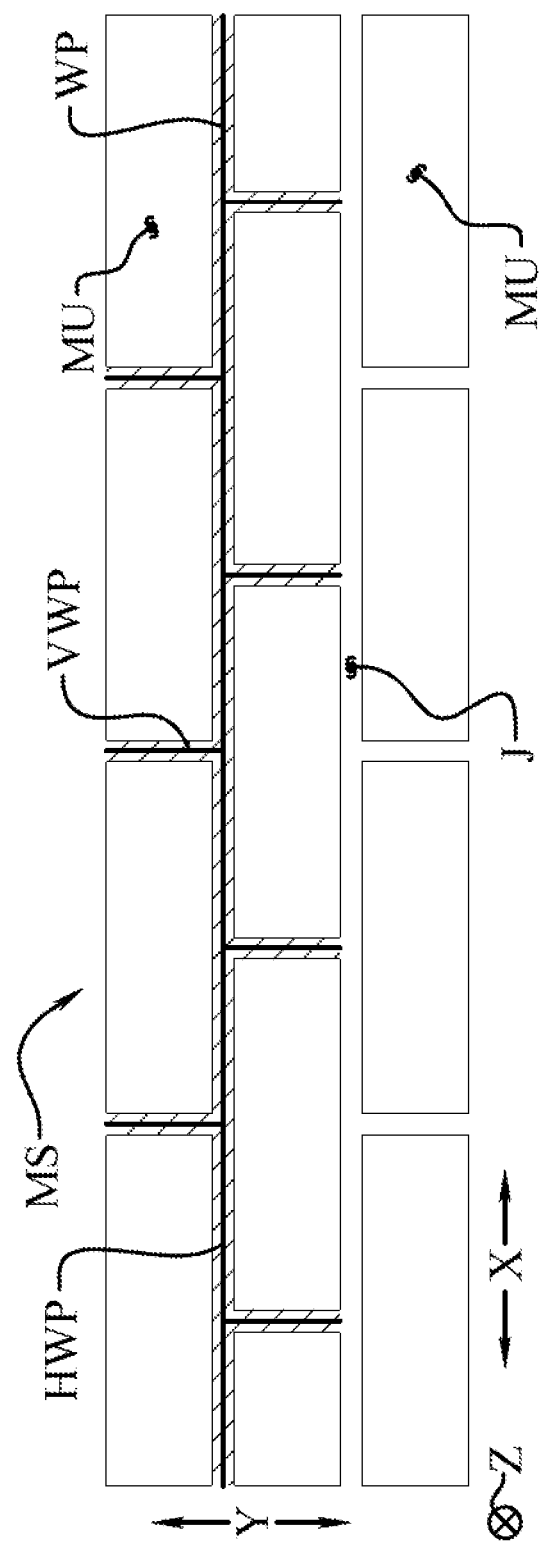
FIG. 9 is an elevation view of a portion of a masonry structure showing a work path, not to scale.
Figure 10:
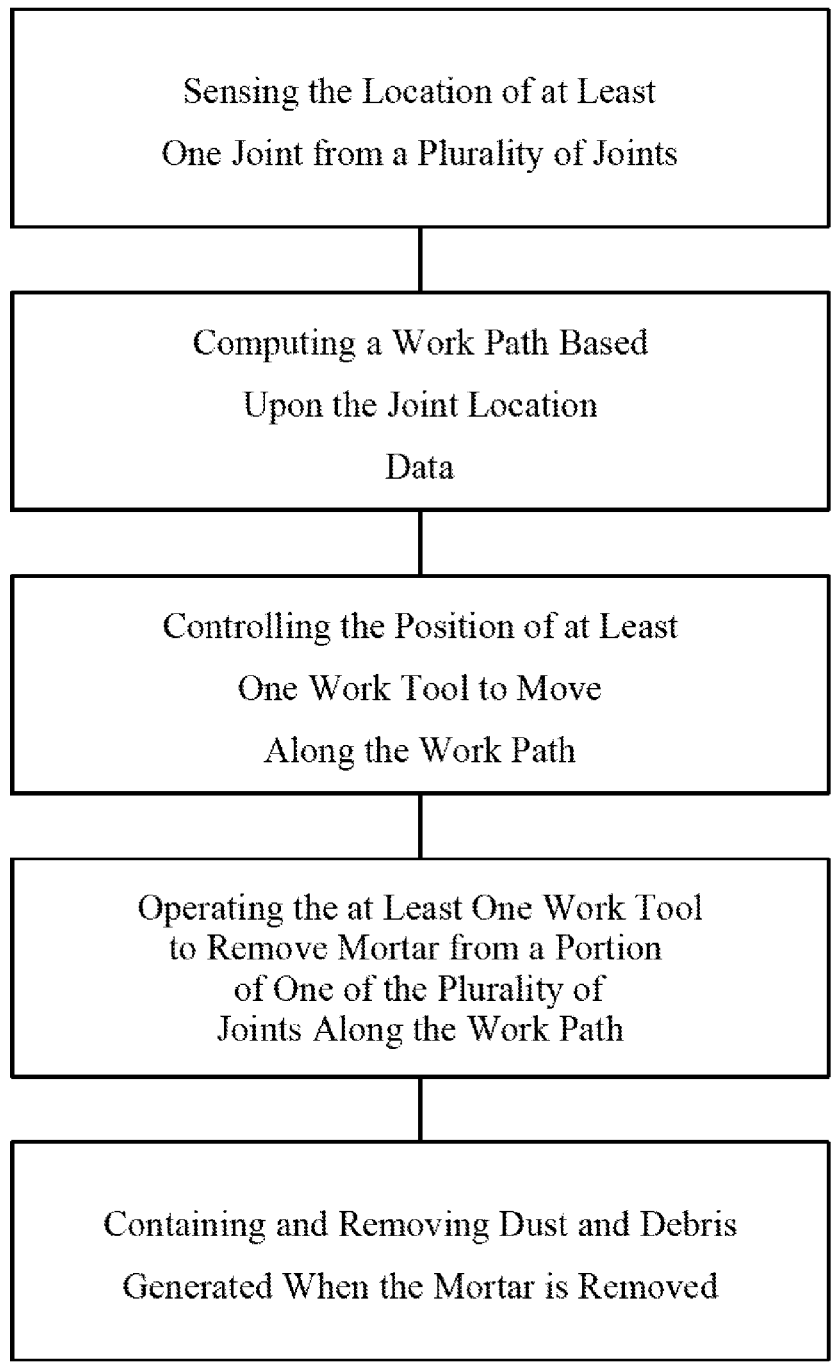
FIG. 10 is a flow chart illustrating an embodiment of a method for mortar removal.

Referring generally to FIGS. 1-10, the method for removing mortar from a plurality of joints (J) between a plurality of masonry units (MU) in a masonry structure (MS) includes a system (10) for mortar removal. The system (10) is configured to remove mortar from at least a portion of one of the plurality of joints (J) so that the joint (J) may be filled with new mortar. Referring now to FIG. 10, in a general embodiment, the steps for accomplishing the method include sensing the location of at least one of the plurality of joints (J) between the plurality of masonry units (MU) and transmitting joint location data to a computer control system (400). Next, the computer control system (400) computes a work path (WP) based upon the joint location data. In a further step, the computer control system (400) controls the position and operation of at least one work tool (200) such that the at least one work tool (200) moves along the work path (WP) to remove mortar from at least a portion of one of the plurality of joints (J) along the work path (WP).

Finally, the dust and debris generated when the at least one work tool (200) removes mortar from at least a portion of one of the plurality of joints (J) along the work path (WP) is contained and removed.

Figure 2:
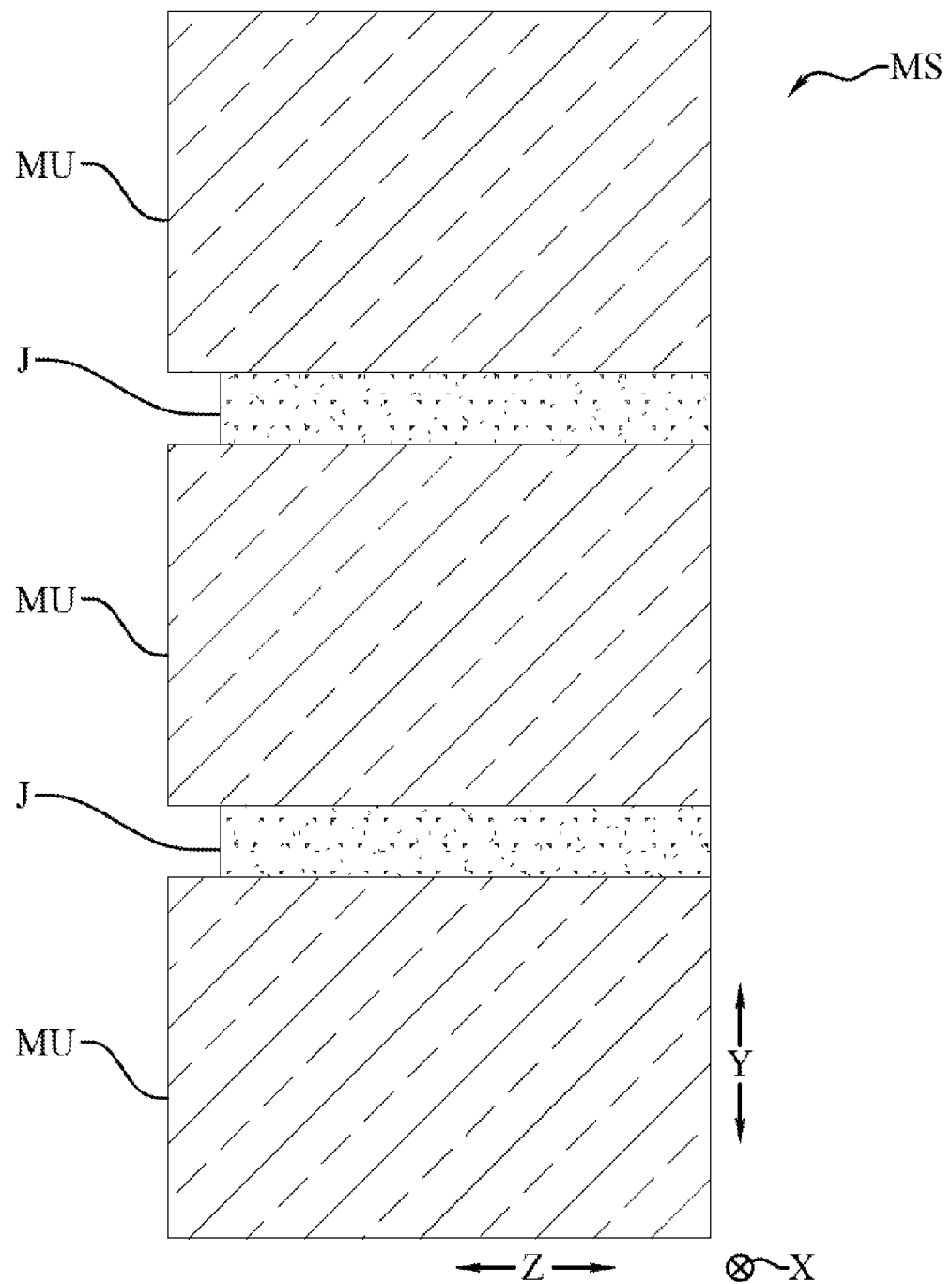
FIG. 2 is a cross sectional view of a portion of a masonry structure taken along section line 2-2 of FIG. 1, not to scale.

A portion of a common masonry structure (MS) is illustrated in FIGS. 1 and 2. The masonry structure (MS) comprises a plurality of masonry units (MU) that are separated by a plurality of joints (J) filled with mortar. The masonry units (MU) may be formed of any material that is used in the masonry industry, including but not limited to, clay bricks, natural stone, stone veneer, ceramic bricks, cement blocks, and fly ash bricks, just to name a few. The mortar is used to bind the masonry units (MU) together and is typically formed of a mixture of sand, a binder such as cement or lime, and water. The mortar is typically softer than the masonry units (MU), and over time will begin to deteriorate, primarily due to water penetration and freeze-thaw cycles. As a result, it becomes necessary to remove the deteriorated mortar from the plurality of joints (J) and to fill in the plurality of joints (J) with new mortar. It should be noted that not all of the mortar from the plurality of joints (J) is removed; rather, a predetermined depth of mortar is removed, which is typically about 0.75 inches to about 1.0 inch. In most instances, the plurality of joints (J) comprise long horizontal joints that extend substantially along the X-axis, as seen in FIG. 1, and short vertical joints that extend substantially along the Y-axis, also seen in FIG. 1. The presently disclosed system (10) is effective for removing mortar from the plurality of joints (J) at a predetermined depth so that the plurality of joints (J) may be filled in with new mortar.

Figure 3:
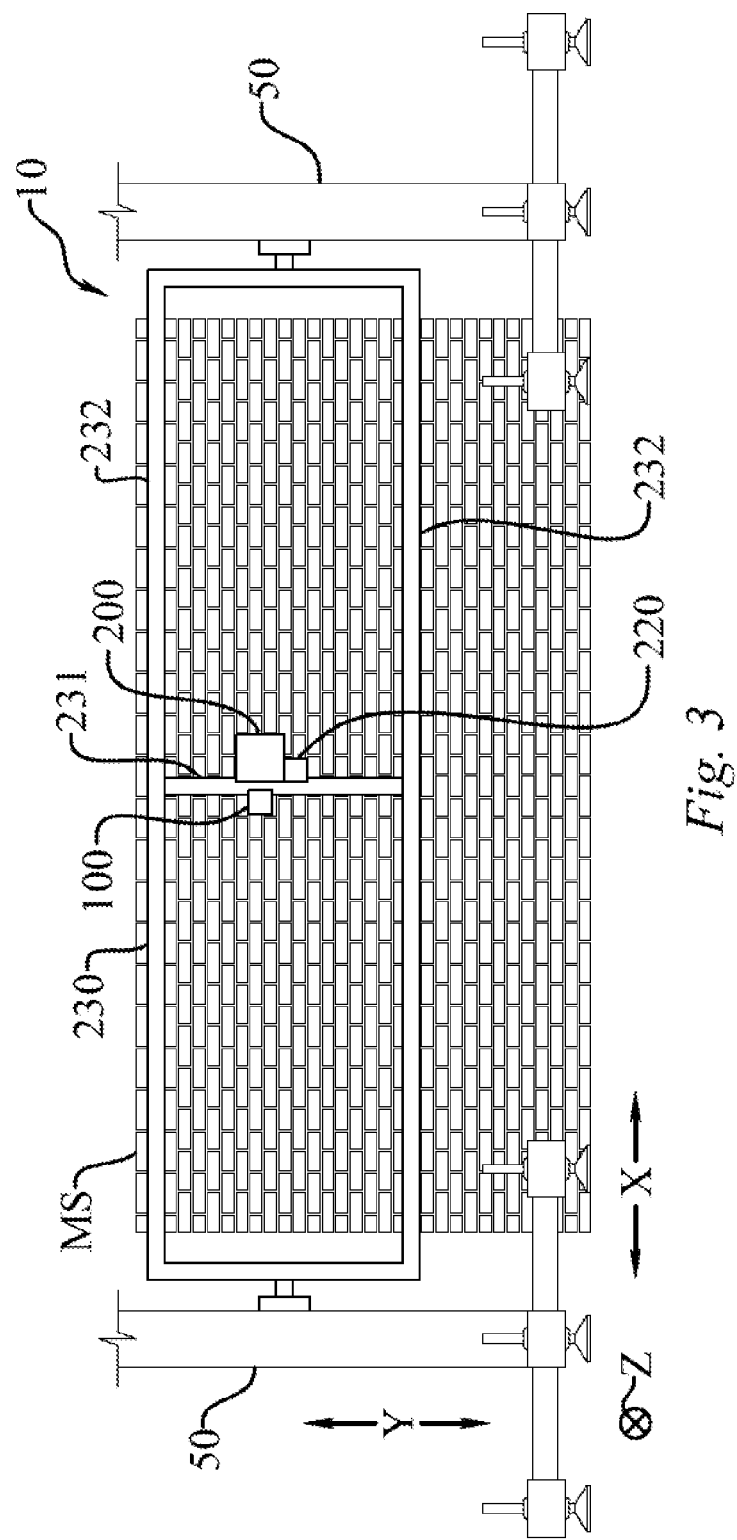
FIG. 3 is an elevation view of an embodiment of a system for mortar removal, not to scale.
Figure 4:
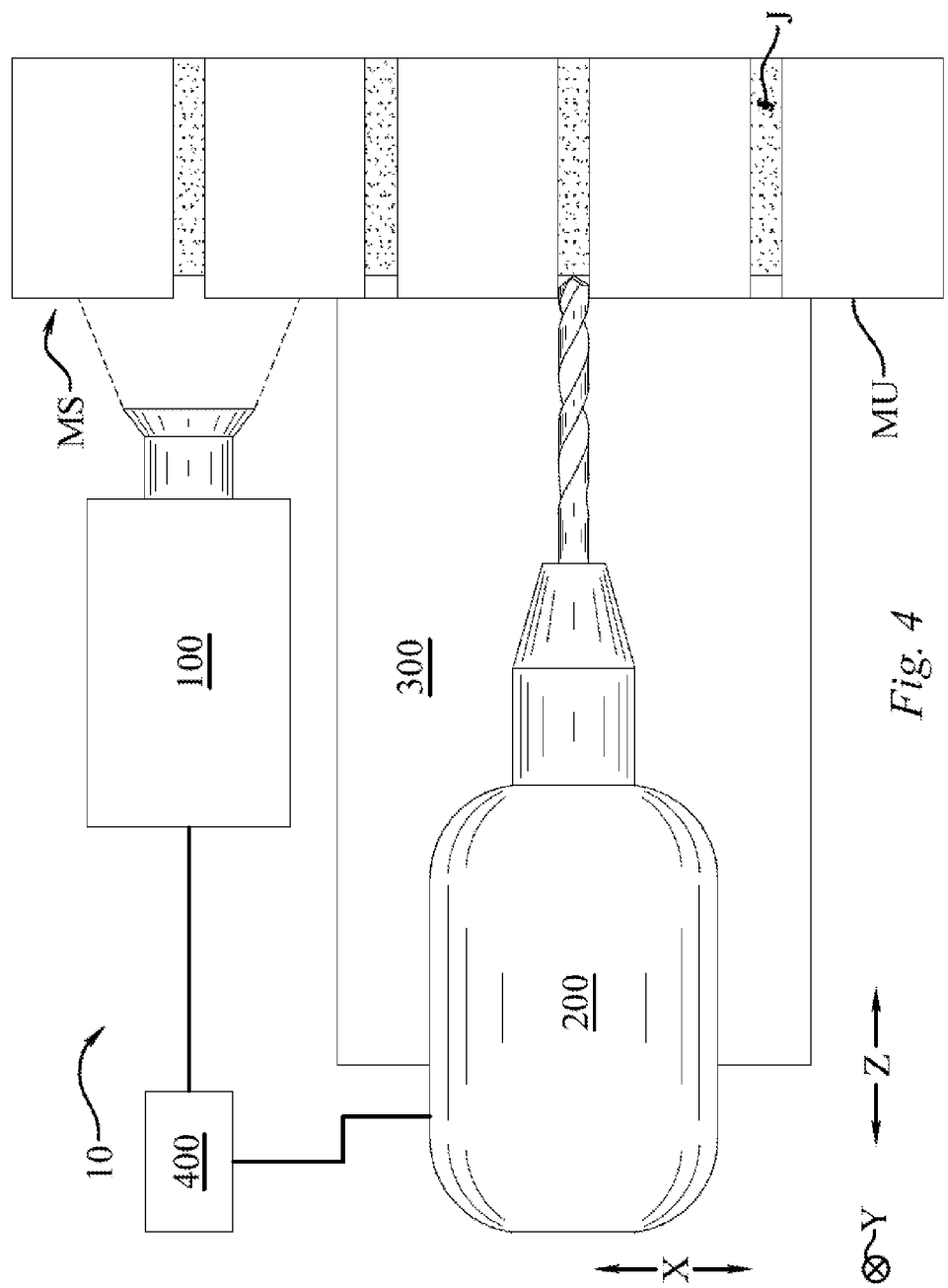
FIG. 4 is a partial schematic view of an embodiment of a system for mortar removal, not to scale.

Referring now to FIG. 3, an embodiment of the system (10) for mortar removal is shown. The system (10) generally includes a joint identification device (100), at least one work tool (200), a containment system (300) (seen in FIGS. 4 and 5), and a computer control system (400) (seen in FIGS. 4 and 5). The joint identification device (100) and the at least one work tool (200) are in electrical communication with the computer control system (400), as seen in FIG. 4. Referring again to FIG. 3, the system (10) may also include an access system (50) to raise and lower the components of the system (10) along an exterior of the masonry structure (MS). Now, the components of the system (10) will be described in greater detail.

The joint identification device (100) is configured to acquire information regarding the plurality of joints (J) between the plurality of masonry units (MU) in the masonry structure (MS). For example, the joint identification device (100) is capable of sensing the location of at least one of the plurality of joints (J) between the plurality of masonry units (MU) and transmitting joint location data to the computer control system (400). In some embodiments the joint location data may include the X, Y, and Z coordinates associated with at least one of the plurality of joints (J). In another embodiment, the joint identification device (100) may be capable of sensing joint dimension data, including the length, width, and depth of at least one of the plurality of joints (J). The joint location and joint dimension data may be acquired in a number of ways, including a remote joint identification device greater than ten feet from the masonry structure (MS), a set-off joint identification device within ten feet of the masonry structure (MS) and capable of automated movement controlled by the computer control system (400), or a local joint identification device positioned within two feet of the suction hood (310), or a combination of one or more of these devices.

In the local joint identification device embodiment, the device acquires information about a joint (J) which may include identification of the location of edges of the masonry units (MU), as well as associated X, Y, and Z coordinates of the recessed corners of the mortar at the intersection with the adjacent masonry units (MU). The joint identification device (100) may further identify the center of the joint, as well as the distance that the work tool (200) is away from a surface of the mortar. Such information may be acquired in any number of ways. One particular embodiment includes a laser sensor system consisting of a laser and a camera in a single housing, and may further include a semi-conductor laser and a complimentary metal oxide semiconductor (CMOS) type camera. One with skill in the art will appreciate that many other forms of joint profiling and tracking may be used. Further, the joint identification device (100) may incorporate off the shelf systems or may incorporate custom configured systems designed to minimize the size of the overall apparatus.

Figure 5:
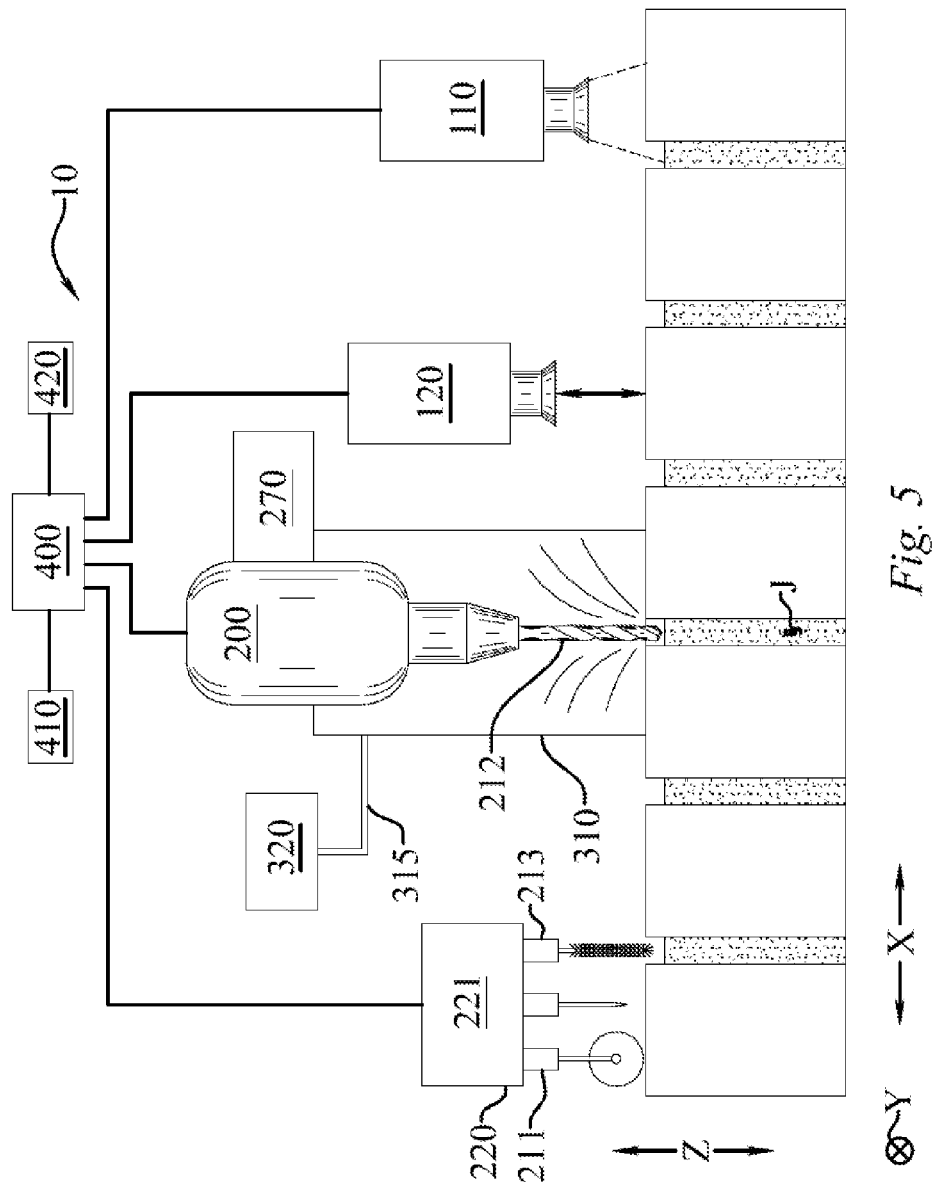
FIG. 5 is a partial schematic view of an embodiment of a system for mortar removal, not to scale.

In one particular embodiment, the joint identification device (100) comprises an optical sensor (110) to optically sense the location of at least one of the plurality of joints (J) between the plurality of masonry units (MU), as seen in FIG. 5. The optical sensor (110) may be a high speed camera and frame grabber that captures images of at least one of the plurality of joints (J) between the plurality of masonry units (MU). Alternatively, a still camera may also be utilized to capture at least one image of the plurality of joints (J), and the still camera may be remote to the system (10) or built into the system (10). For instance, a worker may take a digital image of the masonry structure (MS) which is then uploaded into the system (10) and processed. The captured image data, whether a single image or multiple images, may then be processed with appropriate shape recognition software to calculate joint location data that is transmitted to the computer control system (400); or alternatively, the image may be transferred to the computer control system (400) where it is processed. Moreover, the optical sensor (110) may be configured to sense the shape, size and location of the plurality of masonry units (MU) to determine the location of at least one of the plurality of joints (J). For example, a masonry structure (MS) may include masonry units (MU) of a uniform size, e.g., 3 inch by 8 inch. An operator may manually input the size and shape data, e.g., 3 inch by 8 inch rectangles, of the masonry units (MU) into the computer control system (400), or the system (10) may include a physical sensor that tracks the perimeter of a masonry unit (MU) and loads the acquired data into the computer control system (400). The optical sensor (110) may capture images of the plurality of masonry units (MU), which may then be processed by appropriate software to identify the location of the masonry units (MU) by recognizing the size and shape of the masonry units (MU). The spaces between the recognized masonry units (MU) will represent the location of the joints (J). Commercially available optical sensors (110) that incorporate shape recognition include the INSIGHT series vision systems and CHECKER series vision sensors available from Cognex Corporation of Natick, Mass.

In another embodiment, the joint identification device (100) may include a high speed camera and a laser to acquire 2D images and 3D profiles of at least one of the plurality of joints (J). The laser may be a solid-state laser or a semiconductor laser, just to name a couple, and the camera may be a CMOS type camera. In this embodiment, the joint identification device (100) may acquire joint dimension data corresponding to at least one of the plurality of joints (J) utilizing laser-triangulation measurement, which is then transmitted to the computer control system (400). Alternatively, the captured 2D images and 3D profiles of at least one of the plurality of joints (J) may be processed with appropriate software to calculate joint dimension data that is transmitted to the computer control system (400). Examples of commercially available devices include the Laser Rut Measurement System (LRMS), Laser Road Imaging System (LRIS), and Laser Crack Measurement System (LCMS) manufactured by Institut National D'Optique of Quebec, Canada.

As seen in FIG. 3, the joint identification device (100) may be movably mounted to a carrier frame (230) adjacent to the at least one work tool (200). In one embodiment, the carrier frame (230) includes at least one longitudinal rail (231) movably mounted to and disposed between at least two transverse rails (232). For example, a gear driven drive system powered by stepper motors or servomotors may be secured to the at least one longitudinal rail (231) and the at least two transverse rails (232) such that the at least one longitudinal rail (231) is capable of precise and controlled movement along the at least two transverse rails (232) in the X-axis direction, as seen in FIG. 3. Additionally, the joint identification device (100) and the at least one work tool (200) may each be movably mounted to the at least one longitudinal rail (231) via a gear driven drive system powered by stepper motors or servomotors so that the joint identification device (100) and the at least one work tool (200) are capable of precise and controlled movement along the at least one longitudinal rail (231) in the Y-axis direction, also seen in FIG. 3. In one embodiment, the joint identification device (100) and the at least one work tool (200) are mounted on the at least one longitudinal rail (231) such that they are spaced apart, but lie on the same horizontal axis. Such a carrier frame (230) comprising at least one longitudinal rail (231) and at least two transverse rails (232) with associated drives systems to impart controlled and precise relative movement is well known in the art of CNC machining operations.

Next, the at least one work tool (200) will be described. As previously mentioned, the at least one work tool (200) is movably mounted to the carrier frame (230), as seen in FIG. 3, thus allowing the at least one work tool (200) to move precisely along the X-axis and Y-axis. The at least one work tool (200) is utilized to remove mortar from at least a portion of one of the plurality of joints (J) between the plurality of masonry units (MU). Generally, the at least one work tool (200) is held by a tool holder, such as a chuck, that is attached to a spindle with an associated motor to drive the rotary motion of the at least one work tool (200). As one with skill in the art will recognize, the at least one work tool (200) may be powered electrically, pneumatically, or hydraulically.

In one embodiment, the at least one work tool (200) may comprise a first work tool and a second work tool. The first work tool may be entirely separate from the second work tool, with each work tool separately movably mounted to the carrier frame (230). As will be discussed in more detail below, the first work tool may be utilized to remove mortar from at least a portion of one of the plurality of joints (J) extending substantially along the X-axis, while the second work tool may be utilized to remove mortar from at least a portion of one of the plurality of joints (J) extending substantially along the Y-axis.

Figure 7:
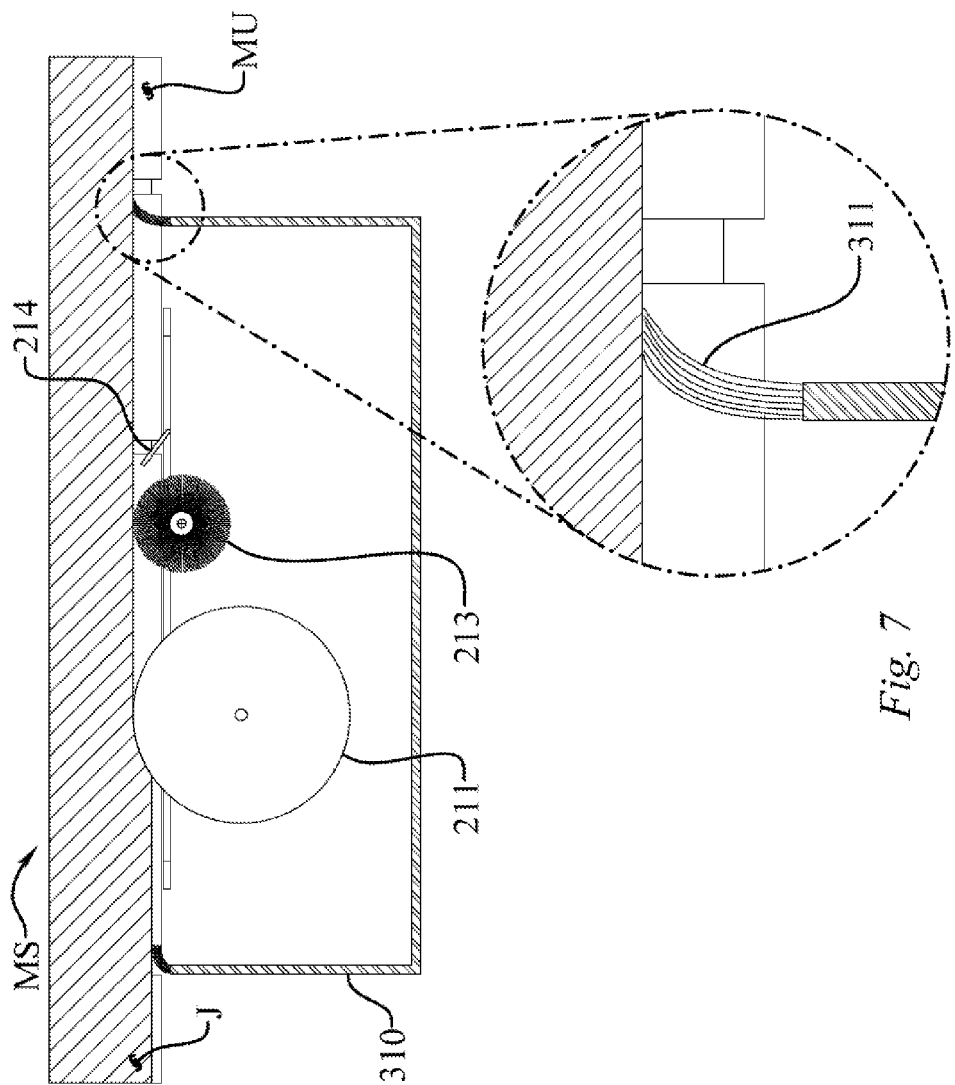
FIG. 7 is a cross sectional view of a portion of an embodiment of a system for mortar removal taken along section line 7-7 of FIG. 6, not to scale.

In one particular embodiment, the at least one work tool (200) comprises a circular blade (211), as seen in FIGS. 7-9. Preferably, the circular blade (211) is a diamond tool, meaning that the circular blade (211) has diamond grains secured to its cutting edges. A diamond tool is preferred because they are well suited for cutting and grinding highly abrasive material, such as mortar. The circular blade (211) is especially preferred for removing mortar from the plurality of joints (J) that extend substantially along the X-axis. A circular blade (211) that is effective for removing mortar along the X-axis will generally not be effective for removing mortar along the Y-axis. This is because the diameter of the circular blade (211) will likely be larger than the width and height of the joints (J) that extend substantially along the Y-axis, and thus the circular blade (211) would damage the masonry units (MU) if used to remove mortar along the Y-axis. Of course, this depends on the size of the circular blade (211) being used to remove the mortar, and it is envisioned that a smaller diameter circular blade (211) may be utilized to remove mortar from joints (J) that extend substantially along the X-axis or Y-axis.

In another embodiment, the at least one work tool (200) comprises a router-type bit (212), as seen in FIG. 5, which may be circular or non-circular. As with the circular blade (211), the router-type bit (212) is preferably a diamond tool. The router-type bit (212) is especially preferred for removing mortar from the plurality of joints (J) that extend substantially along the Y-axis. However, the router-type bit (212) may be effectively utilized to remove mortar from the plurality of joints (J) that extend along the X-axis and Y-axis.

In addition to being movable along the X-axis and Y-axis, the at least one work tool (200) is also configured to move along a Z-axis, which extends toward and away from the masonry structure (MS), as illustrated in FIGS. 4 and 5. To provide for movement along the Z-axis, the at least one work tool (200) may be mounted on a guide driven by means of a ball screw drive, hydraulically, or by means of linear motors. As will be discussed in more detail below, the ability of the at least one work tool (200) to move precisely along the Z-axis allows the depth at which the mortar is removed from the plurality of joints (J) to be controlled.

Although the disclosure discusses the at least one work tool (200) as being primarily a rotary type mechanical tool, other embodiments are envisioned. For example, one with skill in the art would recognize that the at least one work tool (200) may employ traditional mechanical material removal technology, laser technology, water jet or knife technology, air jet or knife technology, or ultrasonic technology capable of removing mortar may be utilized.

Referring now to FIGS. 4-8, the system (10) includes a containment system (300) for collecting dust and debris generated as the at least one work tool (200) removes mortar from at least a portion of one of the plurality of joints (J) between the plurality of masonry units (MU). As previously mentioned, when mortar is removed from at least a portion of one of the plurality of joints (J), the removal process generates silica dust that can be inhaled by workers, which can result in silicosis, a disabling and many times fatal disease that affects the lungs. Thus, the provision of a containment system (300) improves worker safety by effectively containing and removing the dust and debris that is generated when the at least one work tool (200) removes mortar from at least a portion of one of the plurality of joints (J).

As seen in FIGS. 4-8, the containment system (300) includes a suction hood (310) for enclosing the at least one work tool (200). The suction hood (310) is in contact with the masonry structure (MS) around at least fifty percent of the perimeter of the suction hood (310) so as to contain dust and debris, and facilitate its removal. The suction hood (310) may be formed of various materials, including but not limited to light weight metals, acrylics, polycarbonates, vinyl, and other plastic materials, just to name a few. The suction hood (310) may include a series of bristles (311) that engage the masonry structure (MS), as seen in FIG. 7, to accommodate movement of the suction hood (310) while still maintaining an effective barrier. In another embodiment, the suction hood (310) includes at least one biased deflector (312) that engages the masonry structure (MS) to create a barrier, as seen in FIG. 8. In one embodiment the width of the biased deflector (312) is less than the space between adjacent masonry units (MU). Such a biased deflector (312) is particularly beneficial when situated in-line with the at least one work tool (200) such that the biased deflector (312) extends into the region behind the work tool (200) where mortar has already been removed and effectively blocks a majority of the debris flying off the work tool (200) from leaving through the newly created void in the mortar. The bias force of the biased deflector (312) is such that pieces of mortar leaving the work tool (200) at high velocity do not cause the biased deflector (312) to rotate and allow passage of the debris, yet the bias force is not so great as to create considerable resistance to the movement of the suction hood (310). In one particular embodiment, the biased deflector (312) is configured to accommodate movement of the section hood (310) in at least two directions, as seen in FIG. 8. In yet a further embodiment, the length of the biased deflector (312) is at least ten percent of the diameter of the work tool (200) and less than forty-five percent of the diameter of the work tool (200). While the biased deflector (312) is generally constructed of a rigid material such as metal or plastic, one particular embodiment incorporates a resilient material for at least fifty percent of the length of the biased deflector (312). In this embodiment, the resilient portion facilitates changes in travel direction without having to move the suction hood (310) away from the masonry structure (MS) during changes in direction. The resilient portion may include a plurality of metal bristles or a rubber-like composition. It should be noted that while the term suction hood (310) is used herein, this does not imply that the suction hood (310) creates a vacuum or other area of reduced pressure within the suction hood (310); rather, merely that it is a hood connected to an exhaust system to contain and remove a significant amount of dust and debris from the vicinity of the work tool (200).

Referring to FIGS. 4 and 5, the containment system (300) also includes a vacuum system (320), which may broadly include any type of exhaust system. The vacuum system (320) may include a remote exhaust system that is connected to the containment system (300) via conduits, or the vacuum system (320) may be a local unit that travels with the work tool (200) such as a portable centrifugal dust collection system that captures and contains debris near the source. In the remote embodiment, the vacuum system (320) may be secured to the suction hood (310), such as by flexible hoses (315), as shown in FIG. 5. The vacuum system (320) may be a single-stage system or a two-stage system. The vacuum system (320) includes a vacuum source for creating a pressure differential to cause air to flow through the suction hood (310), which draws the dust and debris out of the suction hood (310) for collection by the vacuum system (320). In a typical two-stage system, the larger debris is separated from the dust and finer particles with a collection device, such as a cyclone or a canister. From this point, the air containing the dust and finer particles is typically filtered, such as by passing through a high efficiency filter, before being exhausted to the atmosphere. In one embodiment the vacuum system (320) includes at least one HEPA filter.

The general operation of the system (10) for mortar removal is accomplished in an automated manner through a computer control system (400). As seen schematically in FIGS. 4 and 5, the computer control system (400) is in communication with the joint identification device (100) and the at least one work tool (200). The communication between the computer control system (400) and the joint identification device (100) and the at least one work tool (200) may be achieved with USB, RS-422, RS-485, or wireless connections, just to name a few. As a result, the computer control system (400) is capable of sending and receiving electrical signals representative of commands and/or data to and from the joint identification device (100) and the at least one work tool (200). Generally, the computer control system (400) includes a memory for storing a system software element and a processing unit for interpreting and executing instructions generated by the system software. This general embodiment of the computer control system (400) includes aspects that are similar to conventional CNC (computer numerical control) units, which are well known in the art. The computer control system (400) may be a personal computer system, traditional central processing unit, or virtually any processor platform. The computer control system (400) may also be in communication with a display (410) for graphically illustrating various data and the operation of the system (10), as well as one or more input devices (420) such as a keyboard or mouse to allow an operator to input manual commands and generally oversee the operation of the system (10). One particular embodiment includes a manual data collection device that an operator may use to physically trace complex joint (J) configurations, such as around arches, and transfer the data to the computer control system (400) for additional control of the automated mortar removal process.

The computer control system (400) receives the joint location data from the joint identification device (100) and computes a work path (WP) based upon the joint location data. As previously mentioned, the joint location data may include the X, Y, and Z coordinates associated with at least one of the plurality of joints (J). In addition, and as mentioned above, joint dimension data, including the length, width, and depth of at least one of the plurality of joints (J), may be transmitted to the computer control system (400). In essence, the computer control system (400) processes the joint location data to create a map, or work path (WP), of at least one of the plurality of joints (J) from which mortar is to be removed. After the work path (WP) has been computed, the computer control system (400) controls the position and operation of the at least one work tool (200) such that the at least one work tool (200) removes mortar from at least a portion of one of the plurality of joints (J) along the work path (WP). The positioning and movement of the at least one work tool (200) is controlled by the computer control system (400) issuing commands to controllers associated with the X-axis, Y-axis, and Z-axis drive systems. The computer control system (400) may also be capable of controlling speed, change in direction, and move enable/disable for each axis. Moreover, the computer control system (400) controls the operation of the at least one work tool (200) by issuing enable/disable commands to a controller associated with the work tool motor. Still further, the computer control system (400) may also be capable of controlling the speed of the work tool motor to increase or decrease the rotary speed of the at least one work tool (200). In a further embodiment, at least one temperature sensor monitors the temperature of the work tool (200) to temporarily pause the material removal process, or slow down the process, if the temperature of the work tool (200) exceeds a predetermined level, thereby reducing tool wear and extending the life of the tool.

Controlling the position of the at least one work tool (200) along the Z-axis is important to the success of the system (10) for mortar removal. As mentioned previously, the standard depth at which mortar is typically removed from the plurality of joints (J) is about 0.75 inches to about 1.0 inch. In one embodiment, the method for removing mortar includes the step of controlling the position of the at least one work tool (200) along a Z-axis such that mortar is removed from at least a portion of one of the plurality of joints (J) along the work path (WP) at a predetermined depth. The predetermined depth, typically about 0.75 inches to about 1.0 inch, may be set and input into the computer control system (400) by an operator. As noted above, the joint identification device (100) may transmit the joint location data and/or the joint dimension data to the computer control system (400). Based upon this data, the computer control system (400) is capable of determining the distance between the at least one work tool (200) and at least one of the plurality of joints (J) along the work path (WP) at any give point on the work path (WP). Next, the computer control system (400) controls the position of the at least one work tool (200) along the Z-axis so that the at least one work tool (200) moves to the predetermined depth when operating to remove the mortar. It should be noted that the depth of the plurality of joints (J) along the work path (WP) is likely to be variable along the length of the work path (WP), and thus the distance at which the at least one work tool (200) moves along the Z-axis may be continuously variable as determined by the joint identification device (100) and the computer control system (400). This helps ensure that the mortar being removed from at least a portion of one of the plurality of joints (J) along the work path (WP) is consistently removed at the predetermined depth for all points along the work path (WP). In another embodiment, the computer control system (400) includes a constant depth removal control system in which the system monitors variations in the face of the masonry and adjusts the position of the work tool (200) to ensure that a constant depth of mortar removal is maintained. Building upon this embodiment, the computer control system (400) may actively monitor the amount of mortar removed and adjust the position of the work tool (200) in the Z direction to account for tool wear. A still further embodiment of the computer control system (400) allows an operator to graphically select regions for an alternate mortar removal depth. For instance, the operator may select discreet regions of the masonry structure (MS) in which more, or less, mortar is to be removed to account for variations in the condition of the mortar or to account for structural considerations.

In one particular embodiment, the method for removing mortar from the plurality of joints (J) between the plurality of masonry units (MU) may further comprise the step of sensing the depth of at least a portion of one of the plurality of joints (J) along the work path (WP) after mortar has been removed and transmitting joint depth data to the computer control system (400). This step provides a method for verifying that the at least one work tool (200) removed mortar from at least a portion of one of the plurality of joints (J) along the work path (WP) at the predetermined depth. This may be accomplished by moving the joint identification device (100) over the work path (WP) after mortar has been removed and sensing the depth along the work path (WP) and transmitting the joint depth data to the computer control system (400). Alternatively, the system (10) may include a second joint identification device (100) that follows after the at least one work tool (200) along the work path (WP) when the at least one work tool (200) is operating to remove mortar.

Additionally, the method may include the steps of comparing the joint depth data to the predetermined depth to generate a joint depth differential, and further removing mortar from at least a portion of one of the plurality of joints (J) along the work path (WP) until the joint depth differential is substantially zero, which for purposes of this disclosure is about 0.05 inches. In these steps, the computer control system (400) will compare the joint depth data transmitted by the joint identification device (100) with the predetermined depth input by the operator. As a result, the computer control system (400) will generate a joint depth differential, which is basically the difference between the joint depth sensed by the joint identification device (100) after mortar has been removed and the predetermined depth input by the operator. Next, the computer control system (400) will control the at least one work tool (200) to further remove mortar along points of the work path (WP) where a joint depth differential exists. The process may be repeated until the joint depth differential is substantially zero, thus assuring that the mortar is removed from at least a portion of one of the plurality of joints (J) along the work path (WP) at the predetermined depth.

Referring now to the schematic of FIG. 5, the system (10) for mortar removal may further include a color contrast sensor (120) in communication with the computer control system (400). The color contrast sensor (120) is preferably movably mounted to the carrier frame (230) in the same way the joint identification device (100) and the at least one work tool (200) are mounted. Further, the color contrast sensor (120) should be mounted such that it is fixed on the same horizontal axis (X-axis) as the joint identification device (100) and the at least one work tool (200). Specifically, the color contrast sensor (120) is mounted such that it is capable of moving along the work path (WP) in the same way as the at least one work tool (200) moves along the work path (WP). The color contrast sensor (120) is capable of sensing a color contrast along the work path (WP) and transmitting color contrast data to the computer control system (400). Examples of the color contrast sensor (120) include the CNTX advanced contrast sensor and the CMYX color sensor available from EMX Industries, Inc. of Cleveland, Ohio. The color contrast sensor (120) may represent the color contrast data as integers that correspond to varying levels of color and/or color contrast. In one embodiment, the color contrast sensor (120) may incorporate infrared sensing technology. During mortar removal, the dust that is generated in the containment system (300) will create low light conditions that may interfere with the operation of the color contrast sensor (120). To allow the color contrast sensor (120) to operate in such low light conditions, the color contrast sensor (120) may include an infrared emitter for emitting an infrared light source and an infrared sensor for sensing the infrared light.

For the vast majority of masonry structures (MS), the mortar in the plurality of joints (J) will be a different color than the masonry units (MU). For example, the mortar may be a light gray color and the masonry units (MU) may have a red color. Thus, in one embodiment, when the color contrast sensor (120) is positioned over the light gray colored mortar along the work path (WP) it may represent the color contrast data as an integer within a range of 1 to 5, for example, and when the color contrast sensor (120) is positioned over a red masonry unit (MU) it may represent the color contrast data as an integer within a range of 10 to 15, just as an example. As a result, an operator may input a predetermined color contrast into the computer control system (400) that corresponds to the color contrast data representative of the light gray colored mortar along the work path (WP), e.g., within the range of 1 to 5. Moreover, the computer control system (400) may be programmed to alter the operation of the at least one work tool (200) when the color contrast data received by the computer control system (400) exceeds the predetermined color contrast input by the operator. For example, the computer control system (400) may reposition the at least one work tool (200) to a point along the work path (WP) where the sensed color contrast is within the range of the predetermined color contrast. Such an embodiment ensures that the material the at least one work tool (200) is about to remove is actually the mortar and not the masonry units (MU). In another embodiment, the computer control system (400) may be programmed to alter the operation of the at least one work tool (200) when the color contrast data received by the computer control system (400) differs from the predetermined color contrast input by the operator by a predetermined amount. By stopping the operation of the at least one work tool (200), the operator has an opportunity to verify that only mortar is being removed and that the masonry units (MU) are not being damaged, thus protecting the integrity of the masonry structure (MS) and prolonging the working life of the at least one work tool (200).

In one embodiment, the vacuum system (320) includes a color sensor that is in electrical communication with the computer control system (400). The color sensor is capable of monitoring the color of the dust and debris that is collected during the mortar removal process. The color sensor may incorporate the features listed above with respect to the color contrast sensor (120). For example, an operator may input a predetermined color value into the computer control system (400) that corresponds to the color value representative of the mortar along the work path (WP). The computer control system (400) may be programmed to alter the operation of the at least one work tool (200) when the color value data transmitted by the color sensor and received by the computer control system (400) exceeds the predetermined color value input by the operator. This particular embodiment adds an additional level of control to ensure that only mortar is being removed and that the masonry units (MU) are not being damaged, thus protecting the integrity of the masonry structure (MS) and prolonging the working life of the at least one work tool (200).

In another embodiment, the method for removing mortar may further comprise the step of sensing a work path load applied against the at least one work tool (200) when removing mortar from at least a portion of one of the plurality of joints (J) along the work path (WP) and transmitting work path load data to the computer control system (400). To accomplish this step, the at least one work tool (200) may include a work path load sensor (270) for sensing the resistive load on the at least one work tool (200) as it traverses along the work path (WP) removing mortar, as seen in FIG. 5. For example, the work path load sensor (270) may comprise load cells, a piezoelectric sensor, or any other device that can accurately measure and transmit the travel axis load experienced by the work tool (200) as work path load data to the computer control system (400). The computer control system (400) may monitor the work path load and adjust the speed that the work tool (200) is traversing the work path (WP) to increase productivity when the work path load is below a threshold work path load value, or to decrease the travel speed if the threshold work path load value is exceeded. This variable travel speed control embodiment facilitates increased productivity while reducing the risk of premature tool breakage if a particularly hard portion of mortar is experienced. Yet another embodiment incorporates this same strategy, but in a different manner by incorporating a torque sensor to measure and transmit the torque experienced by the at least one work tool (200) and adjusts the travel axis speed accordingly. Yet even a further embodiment achieves this travel speed control by monitoring the electrical current draw of the work tool (200) and adjusting the travel speed accordingly.

Each of these methods of controlling the travel speed may further be used as a safety to sense when the work tool (200) has cut into something other than mortar and prevent further movement of the work tool (200). For instance, monitoring the work path load experienced by the at least one work tool (200) is another way in which the operation of the at least one work tool (200) may be verified to ensure that the at least one work tool (200) is removing mortar from at least a portion of one of the plurality of joints (J) along the work path (WP) and is not damaging the masonry units (MU). In nearly all masonry structures (MS) the mortar will be relatively softer than the masonry units (MU). This is particularly true when the mortar has deteriorated over time and needs to be removed. As purely an example, the at least one work tool (200) may experience a work path load within a range of about 5 lbf to about 10 lbf when removing mortar, and may experience a work path load within the range of about 20 lbf to about 50 lbf when coming into contact with a masonry unit (MU). Thus, an operator may input a predetermined work path load into the computer control system (400) that corresponds to the work path load data representative of the resistive travel axis load experienced by the at least one work tool (200) when the at least one work tool (200) removes mortar from at least a portion of one of the plurality of joints (J) along the work path (WP), e.g., within the range of about 5 lbf to about 10 lbf. Moreover, the computer control system (400) may be programmed to alter the operation of the at least one work tool (200) when the work path load data received by the computer control system (400) exceeds the predetermined work path load input by the operator. For example, the computer control system (400) may reposition the at least one work tool (200) to a point along the work path (WP) where the work path load is within the range of the predetermined work path load. Such an embodiment ensures that the material that the at least one work tool (200) is removing is the mortar and not the masonry units (MU). In another embodiment, the computer control system (400) may be programmed to stop, or alter, the operation of the at least one work tool (200) when the work path load data received by the computer control system (400) exceeds the predetermined work path load input by the operator. By stopping, or altering, the operation of the at least one work tool (200), the operator has an opportunity to verify that only mortar is being removed and that the masonry units (MU) are not being damaged, thus further protecting the integrity of the masonry structure (MS) and prolonging the working life of the at least one work tool (200).

Even further in another embodiment, each of these methods of controlling the travel speed may be used by the computer control system (400) to determine when a multiple pass approach is required. For example, a multiple pass approach is one in which one single pass of a work tool (200) past a particular location along the joint (J) does not remove all of the desired mortar by design; such as a first pass that removes fifty percent of the desired depth and a second pass that removes the remaining fifty percent of the desired depth. In various embodiments the computer control system (400) may utilize any one of the previously discussed feedback inputs, including, but not limited to, the resistive travel axis load experienced by the at least one work tool (200), the torque, the current draw, or the work tool temperature to recommend a multiple pass approach to the operator, or automatically determine that a multiple pass approach is appropriate and switch to such an approach. In such an embodiment, once a predetermined maximum value is reached the computer control system (400) automatically reduces the removal depth by at least twenty five percent and then proceeds on the prescribed course, and then proceeds to make a second pass to remove the remaining mortar to achieve the desired removal depth. Then, if a predetermined maximum value is again reached the computer control system (400) automatically reduces the original removal depth by at least fifty percent and then proceeds on the prescribed course, and then proceeds to make a second pass to remove the remaining mortar to achieve the desired removal depth. In such embodiments having reduced travel axis speed, or multiple passes so that less mortar is removed per foot of travel, a further embodiment of the computer control system (400) recognizes this and may throttle back the containment system (300) to conserve energy, and/or reduce the flow from the air nozzle (214) to conserve energy and reduce the likelihood of additional wear on the masonry units (MU).

With reference now to FIG. 9, a portion of a masonry structure (MS) is shown with a representation of a work path (WP) computed by the computer control system (400). As seen in FIG. 9, the work path (WP) comprises a horizontal work path (HWP) that extends substantially in the X-axis direction, and a plurality of vertical work paths (VWP) that branch off of the horizontal work path (HWP) and extend substantially in the Y-axis direction. As previously mentioned, a first work tool may be utilized to remove mortar from at least a portion of one of the plurality of joints (J) extending substantially in the X-axis direction, i.e., along a horizontal work path (HWP), while a second work tool may be utilized to remove mortar from at least a portion of one of the plurality of joints (J) extending substantially in the Y-axis direction, i.e., along a vertical work path (VWP). Thus, in one embodiment, the method for removing mortar may further comprise the steps of utilizing the first work tool to remove mortar from at least a portion of one of the plurality of joints (J) along the horizontal work path (HWP), and utilizing the second work tool to remove mortar from at least a portion of one of the plurality of joints (J) along the vertical work path (VWP). In still another embodiment, the first work tool utilized along the horizontal work path (HWP) comprises a circular blade (211) tool, and the second work tool utilized along the vertical work path (VWP) comprises a router-type bit (212) tool. As mentioned above, the first work tool and the second work tool may be separate work tools that are separately movably mounted to the carrier frame (230), or they may be the same tool configured in a different manner.

Alternatively, in another embodiment, the method for removing mortar includes the step of changing the at least one work tool (200) when the work path (WP) transitions from a horizontal work path (HWP) to a vertical work path (VWP). Still further, the at least one work tool (200) for use on the horizontal work path (HWP) comprises a circular blade (211), and the at least one work tool (200) is changed to a router-type bit (212) for use on the vertical work path (VWP).

To accomplish the step of changing the at least one work tool (200), the system (10) for mortar removal further comprises a tool changing system (220) in communication with the computer control system (400), as seen in FIG. 5. The tool changing system (220) is capable of selectively changing out the at least one work tool (200) when the work path (WP) transitions from a horizontal work path (HWP) to a vertical work path (VWP) or vice versa, or based upon variances in the size of a joint (J) or due to work tool (200) wear conditions. The tool changing system (220) includes a tool magazine (221) for holding a plurality of work tools (200), such as the circular blade (211) and a wire rotary brush (213), as seen in FIG. 5. The tool changing system (220) may be movably mounted on the carrier frame (230) near the at least one work tool (200) in the same manner as the joint identification device (100) and the at least one work tool (200) are mounted. Moreover, the tool changing system (220) may be directly coupled to the at least one work tool (200) such that the tool changing system (220) moves synchronously with the at least one work tool (200). The tool changing system (220) may also include a swivel arm to move the tool magazine (221) into alignment with the at least one work tool (200) to effect an automatic tool change.

In operation, the computer control system (400) may transmit command signals to the tool changing system (220) and the at least one work tool (200) when it is determined that the work path (WP) is transitioning from a horizontal work path (HWP) to a vertical work path (VWP) or vice versa. The command signal sent to the at least one work tool (200) may be a disable command to stop the operation of the at least one work tool (200). The command signal sent to the tool changing system (220) may move the tool magazine (221) into alignment with the at least one work tool (200) and effect a tool change. Moreover, the computer control system (400) may be configured to allow an operator to manually input commands to change the at least one work tool (200) at any point in the mortar removal process, not just when the work path (WP) transitions from a horizontal work path (HWP) to a vertical work path (VWP). Still further, the tool magazine (221) may hold similar work tools (200) of different sizes and the tool changing system (220) may be utilized to change a larger work tool (200) to a smaller work tool (200) based upon the joint location data or the joint dimension data stored in the computer control system (400). For example, if the size of a joint (J) at a point along the work path (WP) becomes too narrow for a ¾ inch, for example, router-type bit tool (212) to remove mortar without damaging the adjacent masonry units (MU), then the ¾ inch router-type bit tool (212) may be automatically changed to a smaller ½ inch, for example, router-type bit tool (212). Moreover, the at least one work tool (200) may be changed due to the wear condition of the tool (200).

In a further embodiment, the computer control system (400) may be programmed to operate the work tool (200) to remove mortar from the plurality of joints (J) utilizing a multiple pass approach. A multiple pass approach is one in which a single pass of a work tool (200) past a particular location along the joint (J) does not remove all of the desired mortar by design; such as a first pass that removes fifty percent of the mortar in the joint (J) at a desired depth, and a second pass that removes the remaining fifty percent of the mortar in the joint (J) at the desired depth. The number of passes the work tool (200) may be determined real-time by the computer control system (400) depending on the size of the work tool (200) being utilized, as well as the dimensions and location of the joint (J). Moreover, the multiple pass approach may be utilized to ensure a more precise removal process, which creates a cleaner joint (J) for receiving new mortar.

Figure 6:
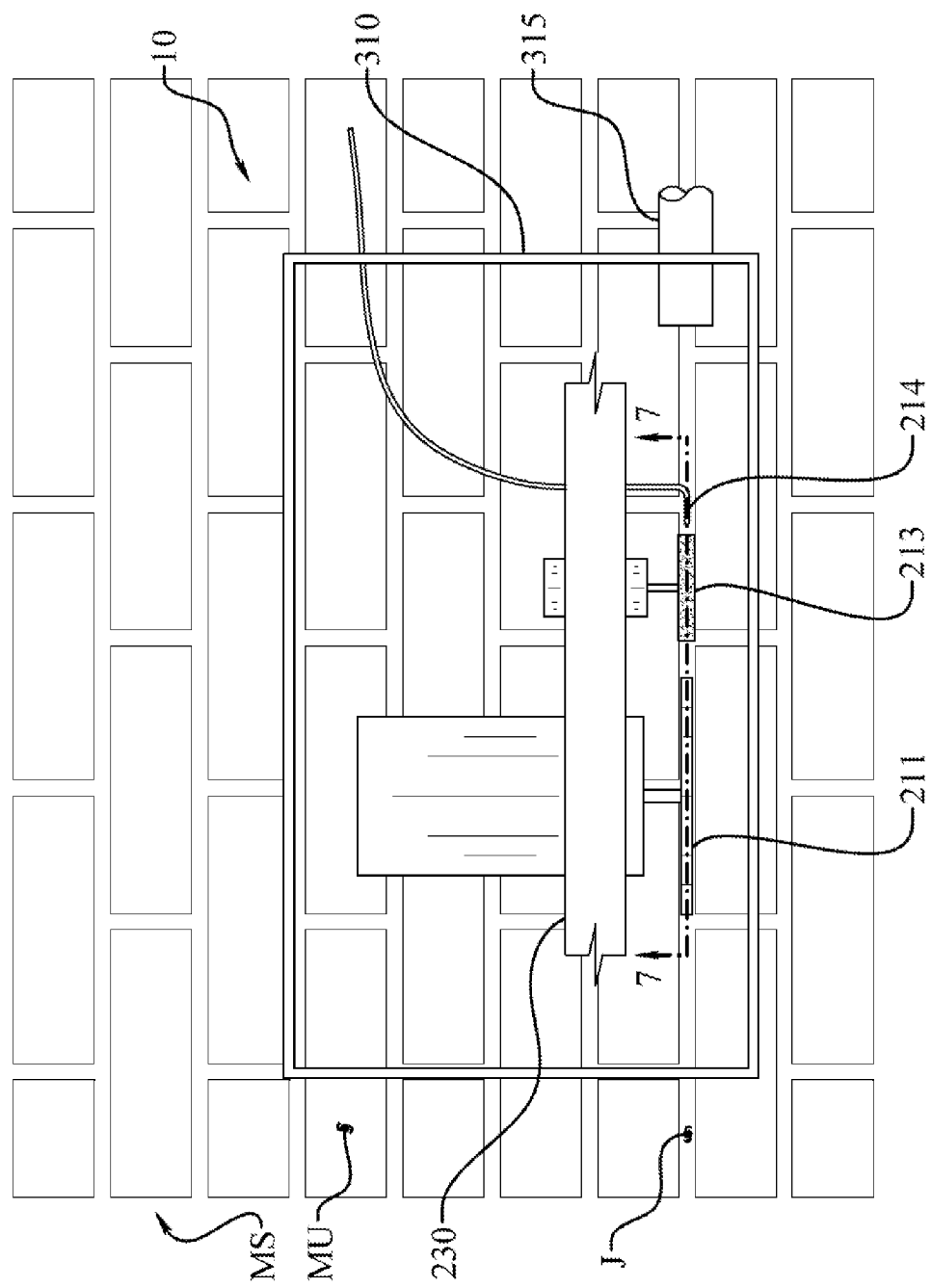
FIG. 6 is an elevation view of a portion of an embodiment of a system for mortar removal, not to scale.

In yet another embodiment, the method for mortar removal may further include the step of brushing at least a portion of one of the plurality of joints (J) along the work path (WP) after mortar has been removed, as illustrated in FIGS. 6-8. As noted above, one of the plurality of work tools (200) held in the tool magazine (221) may be a wire rotary brush (213), as seen in FIG. 5, or a follower rotary brush may be a separate independent tool. Thus, in one embodiment, after the mortar has been removed from the work path (WP), the at least one work tool (200) may be changed via the tool changing system (220) to the wire rotary brush (213), which may then be operated to brush at least a portion of one of the plurality of joints (J) along the work path (WP). In another embodiment, the wire rotary brush (213) may be a separate tool movably mounted to the carrier frame (230) that is controlled to follow after the at least one work tool (200) as it operates along the work path (WP), as shown in FIGS. 6-8. Still further, the wire rotary brush (213) may be directly coupled to the at least one work tool (200) such that it moves synchronously with the at least one work tool (200) as it operates along the work path (WP). Brushing at least a portion of one of the plurality of joints (J) after mortar has been removed further cleans the joint (J) by removing any loose debris that may remain, thus properly preparing the joint (J) to be filled with new mortar.

In a further embodiment, the method for mortar removal may include the step of blowing air into at least a portion of one of the plurality of joints along the work path (WP) after mortar has been removed. Preferably, this step is performed after brushing the joint (J) along the work path (WP). This step may be accomplished by guiding an air nozzle (214) supplied with compressed air along the work path (WP), as seen in FIGS. 6-8. The air nozzle (214) may be mounted on the carrier frame (230), or alternatively may be directly coupled to the wire rotary brush (213) such that it follows the wire rotary brush (213) synchronously along the work path (WP). This step further ensures that the joint (J) is clean by blowing out any dust or loose debris that may remain after mortar removal and brushing. Thus, the air blown joint (J) will be properly prepared to be filled with new mortar.

As previously mentioned, the system (10) for mortar removal may include an access system (50) to raise and lower the components of the system (10), i.e., the joint identification device (100), the at least one work tool (200), and the containment system (300), along an exterior of the masonry structure (MS), as seen in FIG. 3. Preferably, the access system (50) is initially used to raise the system (10) to the top of the masonry structure (MS). The system (10) is then operated to remove mortar from at least a portion of one of the plurality of joints (J). For example, and with continued reference to FIG. 3, the system (10) may be operated to remove mortar from at least a portion of one of the plurality of joints (J) that is within the bounds of the carrier frame (230). After the mortar has been removed from at least a portion of one of the plurality of joints (J) within the bounds of the carrier frame (230), the access system (50) may be utilized to lower, or raise, the system (10) to an area of the masonry structure (MS) where mortar has yet to be removed. Thus, in this embodiment the access system (50) performs the positioning of the carrier frame (230) and then the work tool (200) performs high level positioning on, or within, the carrier frame (230).

In another embodiment, the system (10) may include multiple work tools (200) that are capable of simultaneous operation by the computer control system (400). In this embodiment, the system (10) having multiple work tools (200) may be connected to the carrier frame (230), which is mounted to the access system (50), or multiple carrier frames (230). Alternatively, multiple carrier frames (230) that each carry a system (10) featuring a work tool (200) and a tool changing system (220) may be mounted to the access system (50). These particular embodiments serve to increase the amount of mortar removal and decrease processing times.

The access system (50) may be any system capable of raising and lowering the system (10) along the exterior of the masonry structure (MS), such as hoist driven suspended platform systems and scissor lifts, just to name a couple. A preferred access system (50) is the SKYMASTER brand access system available from Sky Climber, LLC of Delaware, Ohio. The SKYMASTER brand access system is a mast anchor system that utilizes standard platforms and hoists without having to use top side rigging, and is disclosed in U.S. Patent Publication Nos. 20100032237 and 20070000724, which are expressly incorporated by reference as if completely written herein. The system (10) may be secured, for example via the carrier frame (230), to the rails of the lift platform of the access system (50). However, one with skill in the art will appreciate that other arrangements for mounting the system (10) to the access system (50) are possible. The right and left mast sections of the access system (50) seen in FIG. 3 may include a plurality of targets of a known size, location, and orientation, which are easily recognizable by the computer control system (400) and aid in the processing of a work path (WP).

In a further series of embodiments, seen well in FIGS. 11-22, and which are shown by means of illustration only and not limitation, various apparatus and methods for removing mortar from a plurality of joints (J) between a plurality of conjoined masonry units (MU) in a vertical stationary masonry structure (MS) are illustrated. These embodiments may be thought of as manual, or semi-automated, mortar removal methods and benefit from tool movement assistance systems, and vibration damping systems, thereby facilitating the use of high power work tools, as well as any of the features disclosed in the prior automated embodiments.

Figure 18:
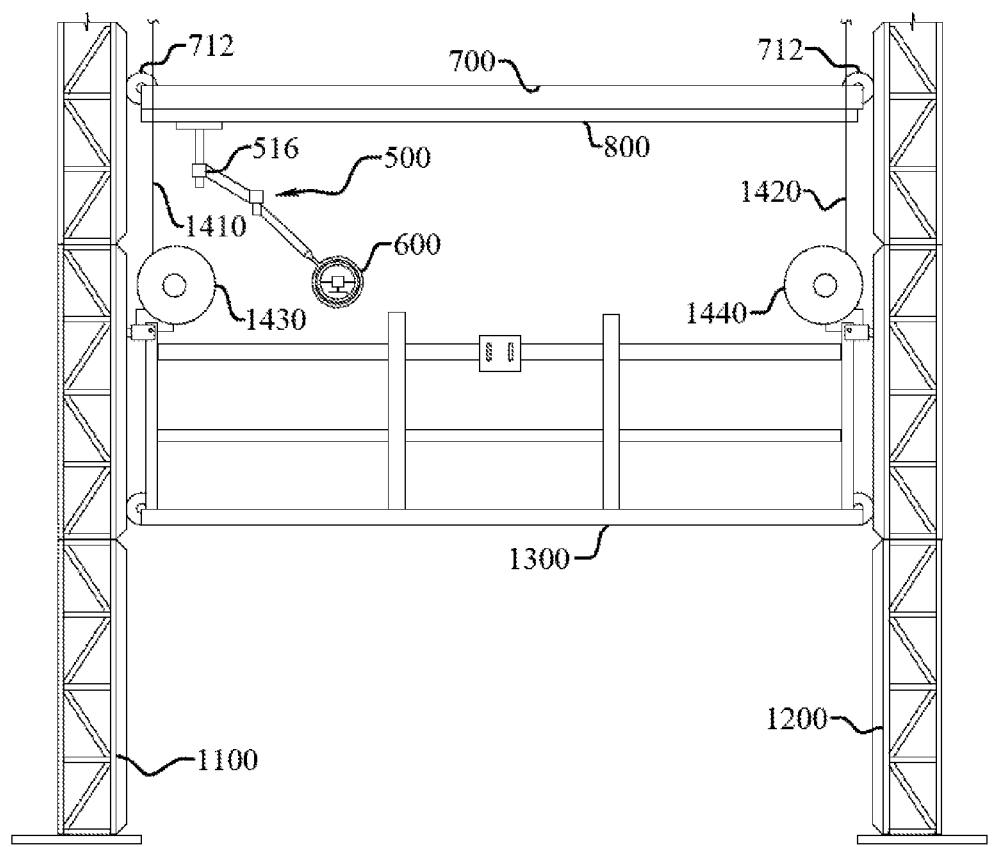
FIG. 18 is an elevation view of a portion of an embodiment of a system for mortar removal, not to scale.
Figure 19:
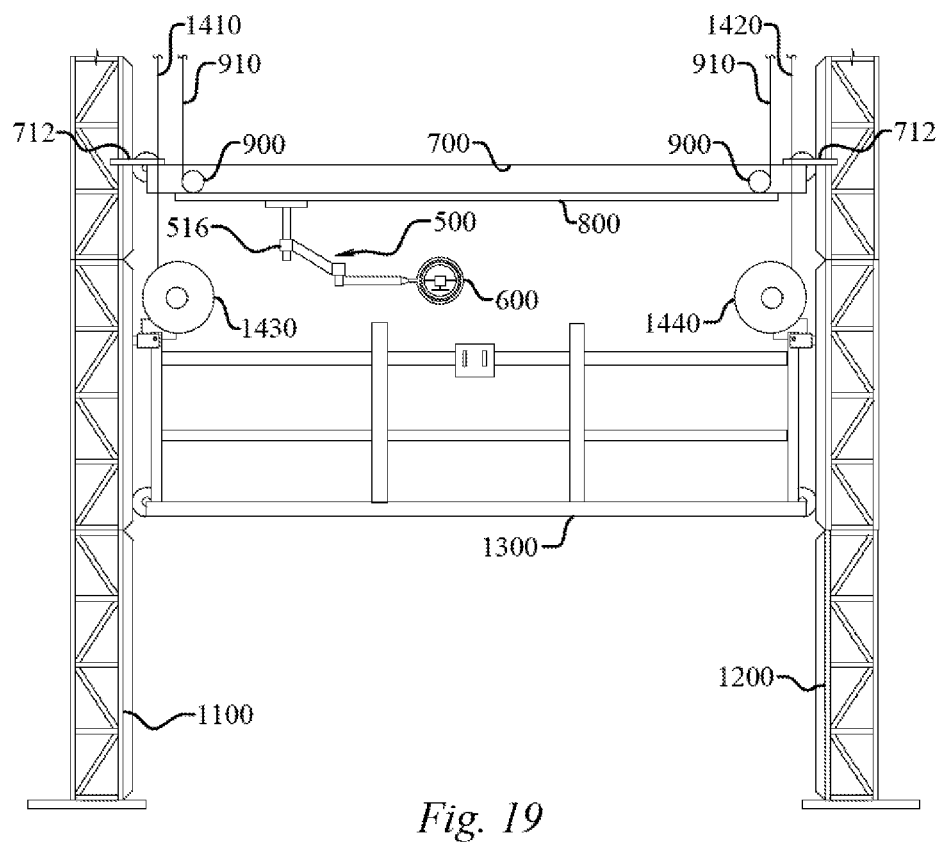
FIG. 19 is an elevation view of a portion of an embodiment of a system for mortar removal, not to scale.
Figure 20:
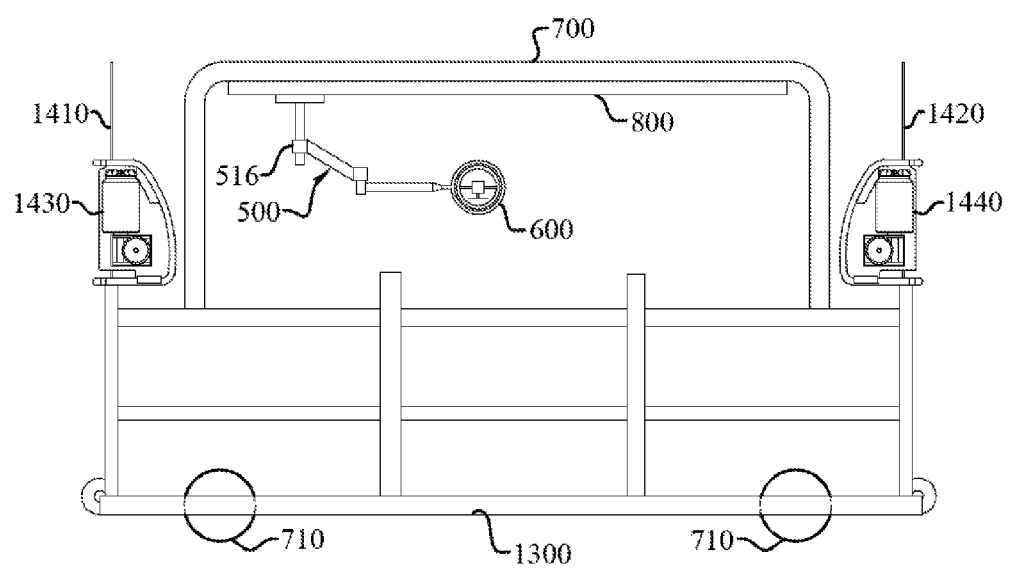
FIG. 20 is an elevation view of a portion of an embodiment of a system for mortar removal, not to scale.

In one possible method, the method may include reversibly positioning a modular mast (1100) adjacent to a work area including a plurality of conjoined masonry units (MU) having a plurality of joints (J), as seen well in FIGS. 18-20. Again with reference to FIGS. 18-20, one can movably secure a suspension work platform (1300) at a first suspension work platform working height and a tool support structure (700) at a first tool support structure working height of at least six feet, to the at least a first modular mast (1100). The tool support structure (700) may be placed within a working distance of at least a first group of conjoined masonry units (MU) having at least one joint (J). The term "working distance" indicates that the tool support platform (700) is positioned such that an apparatus as shown in FIGS. 18-20 is within a safe and convenient distance of the area to be worked, and is in part determined by the scale of the apparatus and the masonry structure (MS), as would be known by one skilled in the art. In one embodiment the tool support platform may be locked to the at least a first modular mast (1100) by a support structure transverse locking system (710) having at least one mast lock (712), as seen well in FIG. 20.

Figure 11:
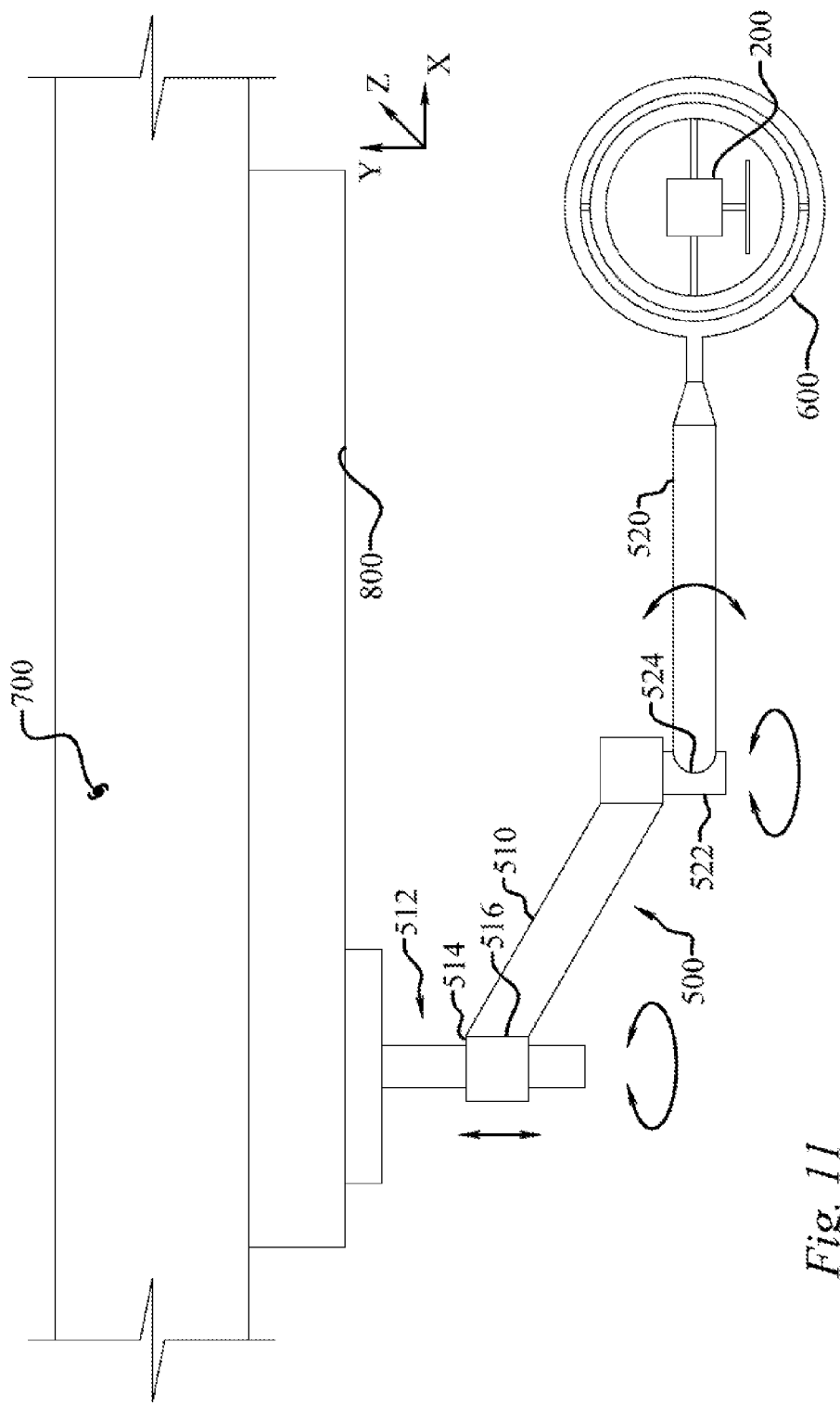
FIG. 11 is an elevation view of a portion of an embodiment of a system for mortar removal, not to scale.
Figure 12:
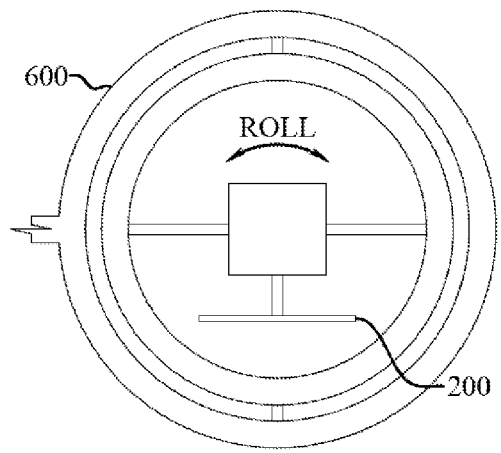
FIG. 12 is an elevation view of a portion of an embodiment of a system for mortar removal, not to scale.
Figure 13:
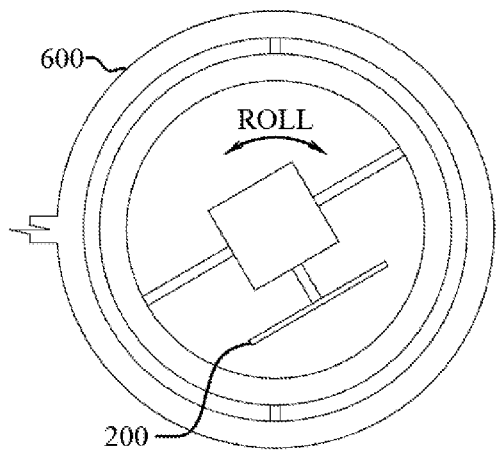
FIG. 13 is an elevation view of a portion of an embodiment of a system for mortar removal, not to scale.
Figure 14:
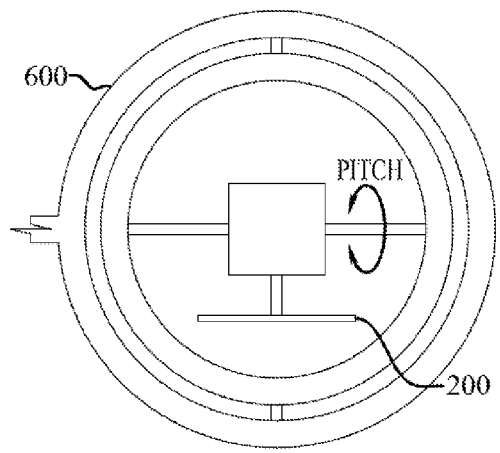
FIG. 14 is an elevation view of a portion of an embodiment of a system for mortar removal, not to scale.
Figure 15:
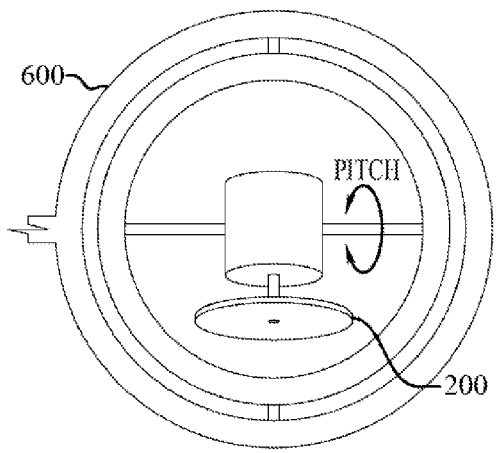
FIG. 15 is an elevation view of a portion of an embodiment of a system for mortar removal, not to scale.

One can articulatably support a work tool (200), having a work tool weight, from an articulating arm system (500) articulatably coupled to a work tool orientation system (600) articulatably coupled to the tool support structure (700), as seen well in FIG. 11. A work tool position may be secured (200) against unintended movement in longitudinal, elevation, and depth directions.

Figure 16:
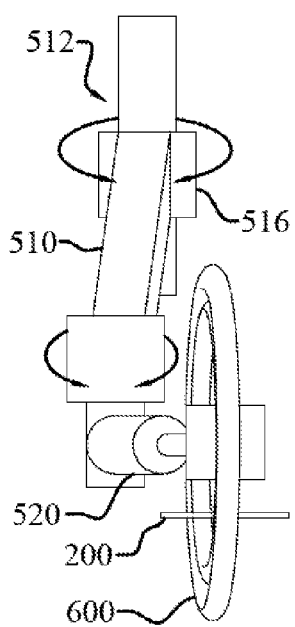
FIG. 16 is an elevation view of a portion of an embodiment of a system for mortar removal, not to scale.
Figure 17:
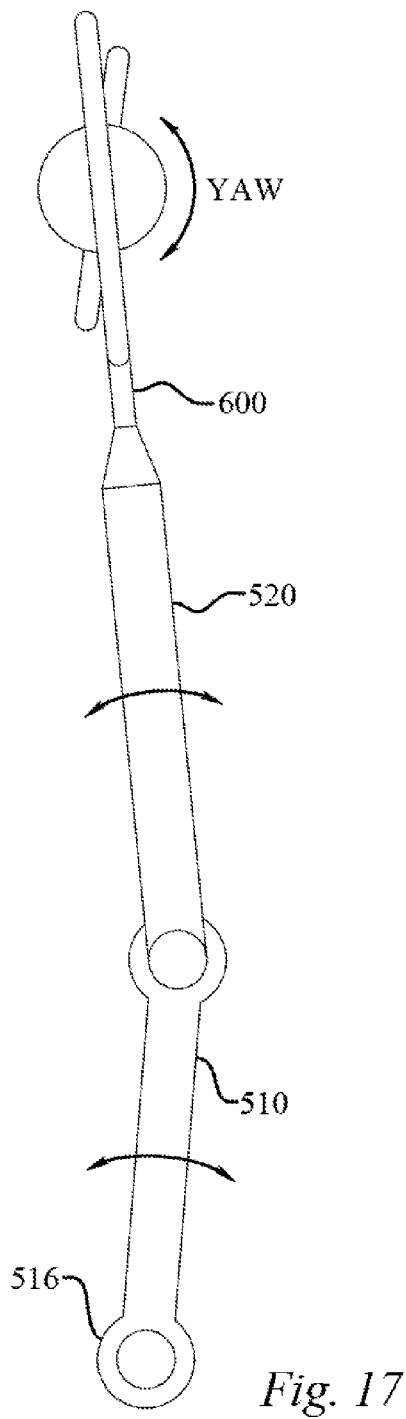
FIG. 17 is an elevation view of a portion of an embodiment of a system for mortar removal, not to scale.

FIGS. 11-17 show possible adjustments in freedom of motion for the work tool (200). In one embodiment, a roll of the work tool (200) may be adjusted to a desired initial roll position, as seen well in FIGS. 12-13, and the work tool (200) locked in the desired initial roll position. In another embodiment a pitch of the work tool (200) may be adjusted to a desired initial pitch position, as seen well in FIGS. 14-15, and the work tool (200) may be locked in the desired initial pitch position. Similarly, in an even further embodiment, the work tool (200) may be adjusted to a desired initial yaw position, as seen in FIG. 17, and the work tool (200) may be locked in the desired initial yaw position. One skilled in the art would realize that adjustments and locking in any of the roll-pitch-yaw directions of freedom of movement may be made in any order, and that all freedoms of motion might not need to be adjusted, or locked, at any particular point in time. In fact in one embodiment each degree of freedom has its own locking system to provide great user flexibility and the ability to make on the fly changes to the location and/or orientation of the work tool (200).

The work tool (200) position may be adjusted to a desired initial work tool elevation and the work tool (200) then locked in elevation position, and the work tool (200) may be adjusted to a desired initial cutting depth in at least a portion of a joint (J) between the plurality of conjoined masonry units (MU). The work tool (200) may then be locked at the desired initial cutting depth.

A further step may include advancing the work tool (200) in a longitudinal direction in at least a portion of the joint (J), as seen in FIG. 6, and removing mortar. When a desired amount and/or length or mortar has been removed, the work tool (200) may be unlocked from the desired initial cutting depth position and removed from the joint (J). The tool support structure (700) may then be unlocked to allow movement. If it is desired to move the apparatus to a further work area, or to make it easier or safer to access any portion of the work area, the suspension work platform (1300) may be moved as needed from the first suspension work platform working height to a second suspension work platform working height, again as seen well in FIGS. 18-20.

Similarly, and with reference again to FIGS. 18-20, the tool support structure (700), after unlocking the support structure transverse locking system (710), may be moved as needed from the first tool support structure working height to a second tool support structure working height within working distance of at least a second group of conjoined masonry units having at least one joint (J). The apparatus may be re-locked to the modular mast (1100) by the support structure transverse locking system (710) having at least one mast lock (712). The work tool (200) may be secured against unintended movement in longitudinal, elevation and depth directions.

As before, and again as seen well in FIGS. 12-17, the roll of the work tool (200) may be adjusted as needed to a desired second roll position and the work tool (200) locked in the desired second roll position; the pitch of the work tool (200) may be adjusted as needed to a desired second pitch position and the work tool (200) locked in the desired second pitch position; and the yaw of the work tool (200) may be adjusted as needed to a desired second yaw position and the work tool (200) locked in the desired second yaw position. The work tool (200) may be adjusted to a desired second work tool elevation and locked in the desired second work tool elevation; and work tool (200) position may be adjusted to a desired second cutting depth in at least a portion of the joint (J). The work tool (200) may be locked at the desired second cutting depth.

Again, and as seen well in FIG. 6, the work tool (200) may be advanced in a longitudinal direction along a portion of the joint (J) and mortar removed. The work tool (200) may be unlocked from the second cutting depth position and removed from the joint (J).

As additional work areas may need to be worked, it is possible to repeat the steps above as many times as are necessary for complete coverage of the desired work area. When work is completed, the method may conclude with unsecuring and removing the suspension work platform (1300) and the tool support structure (700) from the modular mast (1100); and removing the modular mast (1100) from the work area.

In some embodiments, the step of adjusting the work tool (200) position to the initial work tool elevation may require the application of an external elevation adjustment force that is less than twenty percent of the work tool weight. Functionally counterweighting the work tool (200) in this manner may make it both easier and safer to manipulate the work tool (200). In other embodiments, the method may include the step of engaging a multiple joint activation switch with a single touch to at least lock the work tool (200) in the desired initial work tool elevation and lock the work tool (200) in the desired cutting depth. Similarly, the method may include the step of engaging a joint release switch to individually unlock a single degree of freedom of motion selected from the group of motions consisting of the initial work tool elevation and the cutting depth. Additionally, the step of engaging a multiple joint activation switch with a single touch may further lock the initial roll position. Such "one-touch" switching and release mechanisms, as well as others that would be apparent to one skilled in the art, may speed and simplify the operation of the method.

In another set of embodiments, as seen well in FIGS. 11 and 16-17, the articulating arm system (500) may include a radial arm (510) having a radial arm height adjustment system (512) and a tilting arm (520) having a tilting arm radial position joint (522). The step of adjusting the work tool (200) position to the desired initial work tool elevation may include adjusting the height of the radial arm (510) and locking a radial arm height adjustment system joint (514). Similarly, the step of adjusting the work tool (200) position to the desired cutting depth between the plurality of conjoined masonry units (MU) to in the desired cutting depth may include adjusting the tilting arm (520) relative to the radial arm (510) and locking a tilting arm radial position joint (522).

As stated above, various embodiments of the method may include, as would be well-known to those skilled in the art, various "one-touch" locking and release mechanisms so that multiple functions might be accomplished with a single adjustment or touch. These can also include the step of engaging a multiple joint activation switch with a single touch to at least lock the tilting arm vertical position joint (524) and the radial arm radial adjustment system joint (516). This may also include having a step of engaging a joint release switch to individually unlock a single joint selected from the group of joints consisting of the tilting arm vertical position joint (524) and the radial arm radial adjustment system joint (516). One skilled in the art will be able to envision many other "one-touch" adjustments, and they are all intended to be encompassed by this specification.

In a certain set of other embodiments, seen well in FIGS. 11 and 16, the articulating arm system (500) may include a radial arm (510) and a tilting arm (520), and the step of adjusting the work tool (200) position to the desired initial work tool elevation may include adjusting the elevation of the radial arm (510) with respect to tool support structure (700). A radial arm height adjustment system joint (514) may also be locked. Similarly, the step of adjusting the work tool (200) position to the desired cutting depth between the plurality of conjoined masonry units (MU) to the desired cutting depth may include adjusting the radial arm (510) with respect to the tool support structure (700) and locking a radial arm radial adjustment system joint (516).

Just as with the other "one-touch" adjustments noted above, the method may further include the step of engaging a multiple joint activation switch with a single touch to at least lock the radial arm height adjustment system joint (514) and the radial arm radial adjustment system joint (516). And similarly again, a step of engaging a joint release switch may be employed to individually unlock a single joint such as the radial arm height adjustment system joint (514) and the radial arm radial adjustment system joint (516).

The method may, in yet other embodiments, seen well in FIGS. 18-20, involve activating a directional drive system (800) with a drive system control to move the articulating arm system (500), the work tool orientation system (600), and the work tool (200) along the longitudinal direction. In one embodiment the directional drive system (800) is a linear actuator; and in a further embodiment the drive system (800) includes force feedback to adjust the travel speed. As seen well in FIGS. 11-17, the work tool orientation system (600) may be a three-gimbal work tool orientation system (600) mounting allowing simultaneous adjustment of the roll, pitch, and yaw of the work tool (200).

Figure 21:
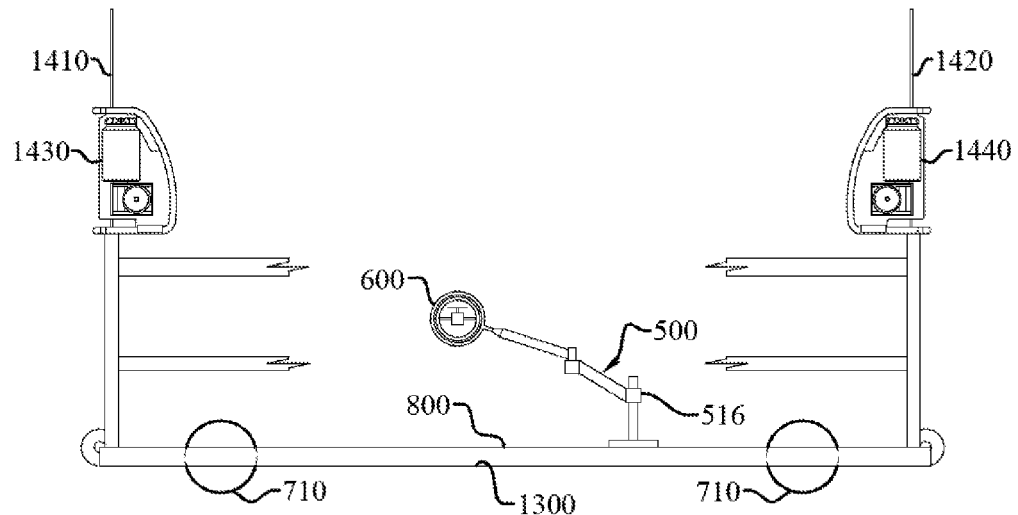
FIG. 21 is an elevation view of a portion of an embodiment of a system for mortar removal, not to scale.
Figure 22:
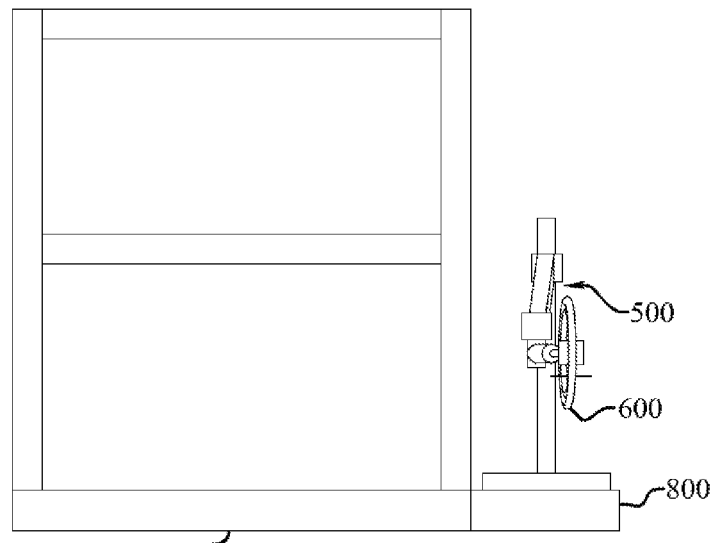
FIG. 22 is an elevation view of a portion of an embodiment of a system for mortar removal, not to scale.

Various methods may be used to position the apparatus. The suspension work platform (1300) may be independently height-adjustable from the tool support structure (700), as seen well in FIGS. 18-19, or the suspension work platform (1300) may be coupled to the tool support structure (700) as seen in FIGS. 20-22. As one skilled in the art would realize, the steps of height adjustment of the work suspension platform (1300) and the tool support structure (700) are combined in those embodiments in which those structures are joined. While in some embodiments the suspension work platform (1300) and the tool support structure (700) are seen as independent structures in a vertical arrangement, they may also be visualized as independent, or joined structures in a parallel arrangement, as seen well in FIGS. 21-22.

In one series of embodiments, seen well in FIGS. 18-20, the step of moving the tool support structure (700) may be carried out by at least one support structure hoist system cable (910) powered by at least one support structure hoist system lift (900). Similarly, and also with reference to FIGS. 18-20, the step of moving the suspension work platform (1300) may be carried out by a suspension work platform hoist system lift (1430).

Similarly, more than one modular mast (1100) may be employed, and therefore the step of securing a suspension work platform (1300) and a tool support structure (700) to a modular mast (1100), would include the step of securing the suspension work platform and the tool support structure (700) to a second mast (1200), or further masts (1100, 1200), as required. As would easily be seen by one skilled in the art, a second suspension work platform cable (1420) and a second suspension work platform hoist system lift (1440) may be employed for greater stability.

In embodiments of the method employing multiple masts (1100, 1200), the step of unsecuring and removing the suspension work platform (1300) and the tool support structure (700) from the modular mast (1100) would further include the step of unsecuring and removing the suspension work platform (1300) and the tool support structure (700) from any other modular masts (1200). Similarly, with multiple masts (1100, 1200) employed, the step of removing the modular mast (1100) from the work area would further include the step of removing any other modular masts (1200) from the work area.

In another embodiment the method includes the steps of: a) elevating a suspension work platform (1300) and a tool support structure (700) to a working height of at least six feet and securing the tool support structure (700) to prevent movement in a transverse Z-direction; b) supporting a work tool (200), having a work tool weight, from the tool support structure (700) with a work tool orientation system (600) secured to the work tool (200), and an articulating arm system (500) secured to the work tool orientation system (600) and the tool support structure (700); c) adjusting the work tool (200) position to a desired initial work tool elevation and locking the work tool (200) in the desired initial work tool elevation; d) adjusting a roll of the work tool (200) to a desired initial roll position and locking the work tool (200) in the desired initial roll position; e) adjusting the work tool (200) position to a desired cutting depth between the plurality of conjoined masonry units (MU) and locking the work tool (200) in the desired cutting depth; f) advancing the work tool (200) in a longitudinal X-direction along a portion of at least one of the plurality of joints (J) and removing mortar; g) unlocking the desired cutting depth position and removing the work tool (200) from between the conjoined masonry units (MU), and releasing the tool support structure (700) to allow movement; h) elevating the tool support structure (700) to a second working height and securing the tool support structure (700) to prevent movement in a transverse Z-direction; i) adjusting the work tool (200) position to a second cutting depth between the plurality of conjoined masonry units (MU) and locking the work tool (200) in the second desired cutting depth; j) advancing the work tool (200) longitudinally along a portion of at least one of the plurality of joints (J) and removing mortar; and k) unlocking the second cutting depth position and removing the work tool (200) from between the conjoined masonry units (MU).

In one particular embodiment the step of elevating the tool support structure (700) is independent of the step of elevating the suspension work platform (1300), such as that seen in FIG. 19. In one embodiment the tool support structure (700) is totally separate from the suspension work platform (1300), and the elevation of the tool support structure (700) is controlled by at least one support structure hoist system lift (900), however in an alternative embodiment the tool support structure (700) may be attached to a boom-type lift mechanism. Similarly, and also with reference to FIGS. 18-20, the step of moving the suspension work platform (1300) may be carried out by a suspension work platform hoist system lift (1430), or in an alternative embodiment via a boom-type lift mechanism. Further, as seen in FIG. 18, the tool support structure (700) may be totally separate from the suspension work platform (1300), yet still have its elevation adjusted via the movement of the suspension work platform (1300). In yet another embodiment, seen in FIG. 20, the tool support structure (700) is attached to the suspension work platform (1300), and at least one suspension work platform hoist system lift (1430) adjusts the elevation of the suspension work platform (1300).

Just as the tool support structure (700) may be independent or attached to the suspension work platform (1300), the step of securing the tool support structure (700) to prevent movement in a transverse Z-direction may be independent or attached to the suspension work platform (1300). In one embodiment the at least one support structure transverse locking system (710) releasably attaches directly to the vertical stationary masonry structure (MS), and may secure directly to the tool support structure (700) or via the suspension work platform (1300). This may be accomplished by vacuum pads, anchors, or any other mechanism known in the field of suspension work platforms. Other embodiments incorporate modular masts whereby the suspension work platform (1300) is suspended from at least a first modular mast (1100) and the step of securing the tool support structure (700) to prevent movement in a transverse Z-direction includes securing at least one support structure transverse locking system (710) to the first modular mast (1100), such as a mast locking device (712) as seen in FIG. 18, which may be as simple as a guided roller system.

In a further embodiment the work tool orientation system (600) includes a containment system (300), such as those previously described. One embodiment includes a suction hood (310) for enclosing the at least one work tool (200), and may incorporate a blade viewing window so that the operator may visually examine the progress of the removal process and make adjustments on the fly.

Numerous alterations, modifications, and variations of the preferred embodiments disclosed herein will be apparent to those skilled in the art and they are all anticipated and contemplated to be within the spirit and scope of the method and system (10) for mortar removal, as claimed below. For example, although specific embodiments have been described in detail, those with skill in the art will understand that the preceding embodiments and variations can be modified to incorporate various types of substitute and or additional or alternative manufacturing processes and materials, relative arrangement of elements, and dimensional configurations. Accordingly, even though only few variations of the method and system (10) are described herein, it is to be understood that the practice of such additional modifications and variations and the equivalents thereof, are within the spirit and scope of the method and system (10) as defined in the following claims. The corresponding structures, materials, acts, and equivalents of all means or step plus function elements in the claims below are intended to include any structure, material, or acts for performing the functions in combination with other claimed elements as specifically claimed.

We claim:

1. A method for removing mortar from a plurality of joints (J) between a plurality of conjoined masonry units (MU) in a vertical stationary masonry structure (MS), comprising:
   a) elevating a suspension work platform (1300) to a working height of at least six feet;
   b) supporting a work tool (200), having a work tool weight, from an articulating arm system (500) attached to the work tool (200) and the suspension work platform (1300);
   c) adjusting the work tool (200) position to a desired initial work tool elevation;
   d) adjusting the work tool (200) position to a desired cutting depth between the plurality of conjoined masonry units (MU);
   e) advancing the work tool (200) in a longitudinal X-direction along a portion of at least one of the plurality of joints (J) and removing mortar;
   f) removing the work tool (200) from between the conjoined masonry units (MU);
   g) elevating the work tool (200) to a second working height;
   h) adjusting the work tool (200) position to a second cutting depth between the plurality of conjoined masonry units (MU);
   i) advancing the work tool (200) longitudinally along a portion of at least one of the plurality of joints (J) and removing mortar; and
   j) removing the work tool (200) from between the conjoined masonry units (MU).

2. The method of claim 1, wherein at least one suspension work platform hoist system lift (1430) adjusts the elevation of the suspension work platform (1300).

3. The method of claim 2, wherein the step of adjusting the work tool (200) position to the initial work tool elevation requires the application of an external elevation adjustment force that is less than twenty percent of the work tool weight.

4. The method of claim 3, wherein the articulating arm system (500) includes a radial arm (510) and a tilting arm (520), wherein the step of adjusting the work tool (200) position to the desired initial work tool elevation includes adjusting the tilting arm (520) with respect to the radial arm (510).

5. The method of claim 4, wherein the step of adjusting the tilting arm (520) with respect to the radial arm (510) further includes locking a tilting arm vertical position joint (524) that joins the radial arm (510) and the tilting arm (520).

6. The method of claim 4, wherein the step of adjusting the work tool (200) position to the desired cutting depth between the plurality of conjoined masonry units (MU) in the desired cutting depth includes adjusting the radial arm (510) with respect to the suspension work platform (1300).

7. The method of claim 6, wherein the step of adjusting the radial arm (510) with respect to the suspension work platform (1300) further includes and locking a radial arm radial adjustment system joint (516).

8. The method of claim 3, wherein the articulating arm system (500) includes a radial arm (510) and a tilting arm (520), wherein the step of adjusting the work tool (200) position to the desired initial work tool elevation includes adjusting the elevation of the radial arm (510) with respect to the suspension work platform (1300).

9. The method of claim 8, wherein the step of adjusting the elevation of the radial arm (510) with respect to the suspension work platform (1300) further includes locking a radial arm height adjustment system joint (514).

10. The method of claim 8, wherein the step of adjusting the work tool (200) position to the desired cutting depth between the plurality of conjoined masonry units (MU) in the desired cutting depth includes adjusting the radial arm (510) with respect to the suspension work platform (1300).

11. The method of claim 10, wherein the step adjusting the radial arm (510) with respect to the suspension work platform (1300) further includes locking a radial arm radial adjustment system joint (516).

12. The method of claim 1, further including the step of activating a unidirectional drive system (800), attaching the articulating arm system (500) to the suspension work platform (1300), with a drive system control to move the articulating arm system (500) and the work tool (200) along the longitudinal X-direction.

13. The method of claim 1, further including a dust collection enclosure adjacent at least a portion of the work tool (200).

14. The method of claim 13, wherein the dust collection enclosure includes a viewing window.

15. A method for removing mortar from a plurality of joints (J) between a plurality of conjoined masonry units (MU) in a vertical stationary masonry structure (MS), comprising:
    a) elevating a suspension work platform (1300) to a working height of at least six feet using at least one suspension work platform hoist system lift (1430);
    b) supporting a work tool (200), having a work tool weight, from an articulating arm system (500) attached to the work tool (200) and the suspension work platform (1300);
    c) adjusting the work tool (200) position to a desired initial work tool elevation by the application of an external elevation adjustment force that is less than twenty percent of the work tool weight;
    d) adjusting the work tool (200) position to a desired cutting depth between the plurality of conjoined masonry units (MU);
    e) advancing the work tool (200) in a longitudinal X-direction along a portion of at least one of the plurality of joints (J) and removing mortar;
    f) removing the work tool (200) from between the conjoined masonry units (MU);
    g) elevating the work tool (200) to a second working height by the application of an external elevation adjustment force that is less than twenty percent of the work tool weight;
    h) adjusting the work tool (200) position to a second cutting depth between the plurality of conjoined masonry units (MU);
    i) advancing the work tool (200) longitudinally along a portion of at least one of the plurality of joints (J) and removing mortar; and
    j) removing the work tool (200) from between the conjoined masonry units (MU).

16. The method of claim 15, wherein the articulating arm system (500) includes a radial arm (510) and a tilting arm (520), wherein the step of adjusting the work tool (200) position to the desired initial work tool elevation includes adjusting the tilting arm (520) with respect to the radial arm (510).

17. The method of claim 16, wherein the step of adjusting the work tool (200) position to the desired cutting depth between the plurality of conjoined masonry units (MU) in the desired cutting depth includes adjusting the radial arm (510) with respect to the suspension work platform (1300).

18. The method of claim 17, wherein the step of adjusting the work tool (200) position to the desired initial work tool elevation includes adjusting the elevation of the radial arm (510) with respect to the suspension work platform (1300).

19. The method of claim 15, further including a dust collection enclosure adjacent at least a portion of the work tool (200).

20. The method of claim 19, wherein the dust collection enclosure includes a viewing window.

* * * * *